United States Patent
Ichida

(10) Patent No.: US 8,879,090 B1
(45) Date of Patent: Nov. 4, 2014

(54) IMAGE FORMING APPARATUS AND METHOD, INFORMATION PROCESSING SYSTEM, AND NON-TRANSITORY COMPUTER READABLE MEDIUM

(71) Applicant: Fuji Xerox Co., Ltd., Tokyo (JP)

(72) Inventor: Hajime Ichida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/148,186

(22) Filed: Jan. 6, 2014

(30) Foreign Application Priority Data

Apr. 26, 2013 (JP) ................................ 2013-094698

(51) Int. Cl.
| | |
|---|---|
| *G06F 15/00* | (2006.01) |
| *G06K 1/00* | (2006.01) |
| *G06K 15/00* | (2006.01) |
| *G06Q 20/14* | (2012.01) |
| *G06F 3/12* | (2006.01) |

(52) U.S. Cl.
CPC .......... *G06K 15/4095* (2013.01); *G06Q 20/145* (2013.01)
USPC ........................................ 358/1.14; 358/1.15

(58) Field of Classification Search
CPC .. G06K 15/00; G06K 15/4095; G06F 3/1296; G06F 21/0098; G06Q 20/145
USPC ........................................ 358/1.14, 1.15, 1.13
See application file for complete search history.

(56) References Cited

U.S. PATENT DOCUMENTS

2013/0198211 A1* 8/2013 Kohkaki et al. ............... 707/756
2013/0215460 A1* 8/2013 Eguchi ......................... 358/1.15

FOREIGN PATENT DOCUMENTS

JP           10-207661 A      8/1998

* cited by examiner

*Primary Examiner* — Douglas Tran
(74) *Attorney, Agent, or Firm* — Sughrue Mion, PLLC

(57) ABSTRACT

An image forming apparatus performs printing processing using first identification information in a first system in a particular organization that performs first authentication, the first identification information being information that identifies a user in the first authentication. The image forming apparatus includes an obtaining unit and a controller. The obtaining unit obtains print data from a logical printer in a second system that is a cloud service system that performs second authentication. Setting information including the first identification information is set in the logical printer, and the image forming apparatus is set as an output destination in the logical printer. The controller controls printing processing of the print data obtained by the obtaining unit using the first identification information included in setting information set in the obtained print data. Identification information of the user, which is temporarily issued in the first system, is used as the first identification information.

12 Claims, 16 Drawing Sheets

FIG. 9

| TEMPORARY ID | REGULAR LOCAL ID | EFFECTIVE PERIOD |
|---|---|---|
| fx50000 | fx23456 | 4/1/2013 10:00-17:00 |
| fx50001 | fx12345 | 4/1/2013 10:30-17:00 |
| ⋮ | ⋮ | ⋮ |

FIG. 10

| GUEST INFORMATION MANAGEMENT ID | ISSUED ID (GUEST ID) | EFFECTIVE PERIOD | GUEST NAME | BELONG TO | DESTINATION OF VISIT |
|---|---|---|---|---|---|
| gt123456 | fx90001 | 4/1/2013 10:00-17:00 | SABURO SATO | XX COMPANY, X DIVISION | fx10002 |
| gt123457 | fx90002 | 4/1/2013 10:00-17:00 | HANAKO SUZUKI | YY COMPANY, Y DIVISION | dv123 |
| gt123458 | fx90003 | 4/1/2013 10:00-17:00 | JIRO TANAKA | ZZ UNIVERSITY, Z DEPARTMENT | pr345 |
| ⋮ | ⋮ | ⋮ | ⋮ | ⋮ | ⋮ |

FIG. 11A

| TIME AND DATE | TYPE OF PROCESSING | LOCAL ID | NUMBER OF PRINTS | ... | IMAGE LOG | CLOUD ID |
|---|---|---|---|---|---|---|
| 4/1/2013 10:25:20 | COPY | fx12345 | 20 | ... | 00123.jpg | – |
| 4/1/2013 10:27:03 | PRINT | fx90001 | 5 | ... | 00124.pdf | bcd@cloud |
| 4/1/2013 10:28:20 | PRINT | fx50001 | 30 | ... | 00125.jpg | efgbc@cloud |
| 4/1/2013 10:31:30 | COPY | fx23345 | 10 | ... | 00126.jpg | – |
| ⋮ | | | | | | |

FIG. 11B

| TIME AND DATE | TYPE OF PROCESSING | LOCAL ID | NUMBER OF PRINTS | ... | IMAGE LOG | CLOUD ID | ID USER |
|---|---|---|---|---|---|---|---|
| 4/1/2013 10:25:20 | COPY | fx12345 | 20 | ... | 00123.jpg | – | – |
| 4/1/2013 10:27:03 | PRINT | fx90001 | 5 | ... | 00124.pdf | bcd@cloud | gt123456 |
| 4/1/2013 10:28:20 | PRINT | fx50001 | 30 | ... | 00125.jpg | efgbc@cloud | fx12345 |
| 4/1/2013 10:31:30 | COPY | fx23345 | 10 | ... | 00126.jpg | – | – |
| ⋮ | | | | | | | |

FIG. 12

| LOCAL ID | NAME | CONTACT | MEMBER DIVISION | MEMBER PROJECT | ......... |
|---|---|---|---|---|---|
| fx10001 | TARO TANAKA | tanaka@example... | dv101 | pr012, pr123 | ......... |
| fx10002 | REIICHI FUJI | fuji@example... | dv101 | pr345 | ......... |
| ⋮ | ⋮ | ⋮ | ⋮ | ⋮ | ⋮ |

FIG. 13

| DIVISION ID | NAME | CONTACT | ......... |
|---|---|---|---|
| dv101 | aaa DIVISION | aaa@example... | ......... |
| dv102 | bbb DIVISION | bbb@example... | ......... |
| ⋮ | ⋮ | ⋮ | ⋮ |

FIG. 14

| PROJECT ID | NAME | CONTACT | ········ |
|---|---|---|---|
| pr101 | ppp PROJECT | ppp@example... | ········ |
| pr102 | qqq SEMINAR | qqq@example... | ········ |
| ⋮ | ⋮ | ⋮ | ⋮ |

FIG. 15

```
<PRINT TICKET>
    ·················
    ·················
    <LOCAL ID> fx23456 </LOCAL ID>
    <TO-BE-BILLED DESTINATION> pr456 </TO-BE-BILLED DESTINATION>
</PRINT TICKET>
```

FIG. 16

| GUEST INFORMATION MANAGEMENT ID | ISSUED ID (GUEST ID) | ⋯ | BILLING SYSTEM |
|---|---|---|---|
| gt123456 | fx90001 | ⋯ | CASH |
| ⋮ | ⋮ | ⋮ | ⋮ |
| gt125678 | fx93456 | ⋯ | CHANGE TO pr1234 |
| ⋮ | ⋮ | ⋮ | ⋮ |

FIG. 17

| TIME AND DATE | TYPE OF PROCESSING | LOCAL ID | NUMBER OF PRINTS | ⋯ | TO-BE-BILLED DESTINATION | CLOUD ID | ID USER |
|---|---|---|---|---|---|---|---|
| 4/1/2013 10:25:20 | COPY | fx12345 | 20 | ⋯ | fx12345 | – | – |
| 4/1/2013 10:27:03 | PRINT | fx90001 | 5 | ⋯ | CASH (UNSETTLED) | bcd@cloud | gt123456 |
| 4/1/2013 10:28:20 | PRINT | fx91002 | 30 | ⋯ | dv123 | efgbc@cloud | gt123567 |
| 4/1/2013 10:31:30 | COPY | fx23345 | 10 | ⋯ | pr102 | – | – |
| ⋮ | | | | | | | |

FIG. 18

| LOCAL ID | COLOR | DOUBLE-SIDED | MAXIMUM NUMBER OF PRINTS | ... | PRINT | COPY | FAX | SCAN |
|---|---|---|---|---|---|---|---|---|
| fx10001 | ✓ | ✓ | 324 | ...... | ✓ | ✓ | ✓ | ✓ |
| fx10002 | ✓ | ✓ | 220 | ...... | ✓ | ✓ | ✓ | ✓ |
| fx10003 | ✓ | ✓ | 12 | ...... | ✓ | ✓ | NA | ✓ |
| ... | ... | ... | ... | ... | ... | ... | ... | ... |
| fx50001 – fx59999 (TEMPORARY) | NA | NA | 100 | ...... | ✓ | ✓ | NA | ✓ |
| fx90001 – fx99999 (GUEST) | NA | NA | 30 | ...... | ✓ | ✓ | NA | NA |

IMAGE FORMING APPARATUS AND METHOD, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-094698 filed Apr. 26, 2013.

BACKGROUND (i) Technical Field

The present invention relates to an image forming apparatus and method, an information processing system, and a non-transitory computer readable medium.

(ii) Related Art

Existing print services are generally on-premises services installed at individual organizations (such as companies and schools). Because an on-premises print service (server) is a closed system for each organization, user identification information (ID) (such as an employee number) unique to that organization may be used as it is as a user account. Therefore, security printing and aggregation management of print jobs may be easily performed using user IDs unique to each organization.

In contrast, cloud print services provided on the Internet 400, such as Google Cloud Print (trademark) developed by Google, have been proposed in recent years. A user at a personal computer (PC) or the like logs in to a cloud print service with a user ID for that service, and, after the user logs in, the user sends print data to the cloud print service. The print data is printed by providing the print data from the cloud print service to an image forming apparatus via the Internet 400 or the like.

Unlike on-premises services, cloud print services are shared among plural organizations or individuals, and each cloud print service allocates user IDs independent of the individual organizations. Because users may not be able to obtain, as their user IDs for the cloud print services, the same user IDs as those in their organizations, user IDs used for user authentication in the cloud print services do not generally coincide with user IDs that are given in and unique to the individual organizations. A cloud print service knows a user ID for that service with regard to print data, but does not know a user ID unique to each organization. Therefore, when print data is provided from a cloud print service to an image forming apparatus and is printed with the image forming apparatus, because that print data includes no user ID unique to an organization, the image forming apparatus is unable to perform security printing or aggregation management regarding that print data on the basis of the user ID unique to the organization.

In user management in a print service system such as a cloud print service, only user identification information in the print service system is managed. Therefore, if there is any information that may be sent as user identification information of print data from the print service system to an image forming apparatus in a certain organization, that information is the user identification information in the print service system, not in the organization.

SUMMARY

According to an aspect of the invention, there is provided an image forming apparatus performs printing processing using first identification information in a first system in a particular organization that performs first authentication, the first identification information being information that identifies a user in the first authentication. The image forming apparatus includes an obtaining unit and a controller. The obtaining unit obtains print data from a logical printer in a second system that is a cloud service system that performs second authentication. Setting information including the first identification information is set in the logical printer, and the image forming apparatus is set as an output destination in the logical printer. The controller controls printing processing of the print data obtained by the obtaining unit using the first identification information included in setting information set in the obtained print data. Identification information of the user, which is temporarily issued in the first system, is used as the first identification information.

BRIEF DESCRIPTION OF THE DRAWINGS

An exemplary embodiment of the present invention will be described in detail based on the following figures, wherein:

FIG. 9 is a diagram illustrating an example of temporary ID management information;

FIG. 10 is a diagram illustrating an example of guest ID management information;

FIGS. 11A and 11B are diagrams illustrating examples of log information of processing recorded by the image forming apparatus and an aggregation apparatus in the system using a temporary local ID (in-house ID);

FIG. 12 is a diagram illustrating an example of user management information;

FIG. 13 is a diagram illustrating an example of division management information;

FIG. 14 is a diagram illustrating an example of project management information;

FIG. 15 is a diagram conceptually illustrating a print ticket including, in addition to a local ID, a uniquely defined element representing a to-be-billed destination;

FIG. 16 is a diagram illustrating an example of guest ID management information including information on a billing system;

FIG. 17 is a diagram illustrating an example of log information including information on a to-be-billed destination, recorded by the image forming apparatus;

FIG. 18 is a diagram illustrating an example of use authority information representing the use authority of each user;

DETAILED DESCRIPTION

Figure 1:
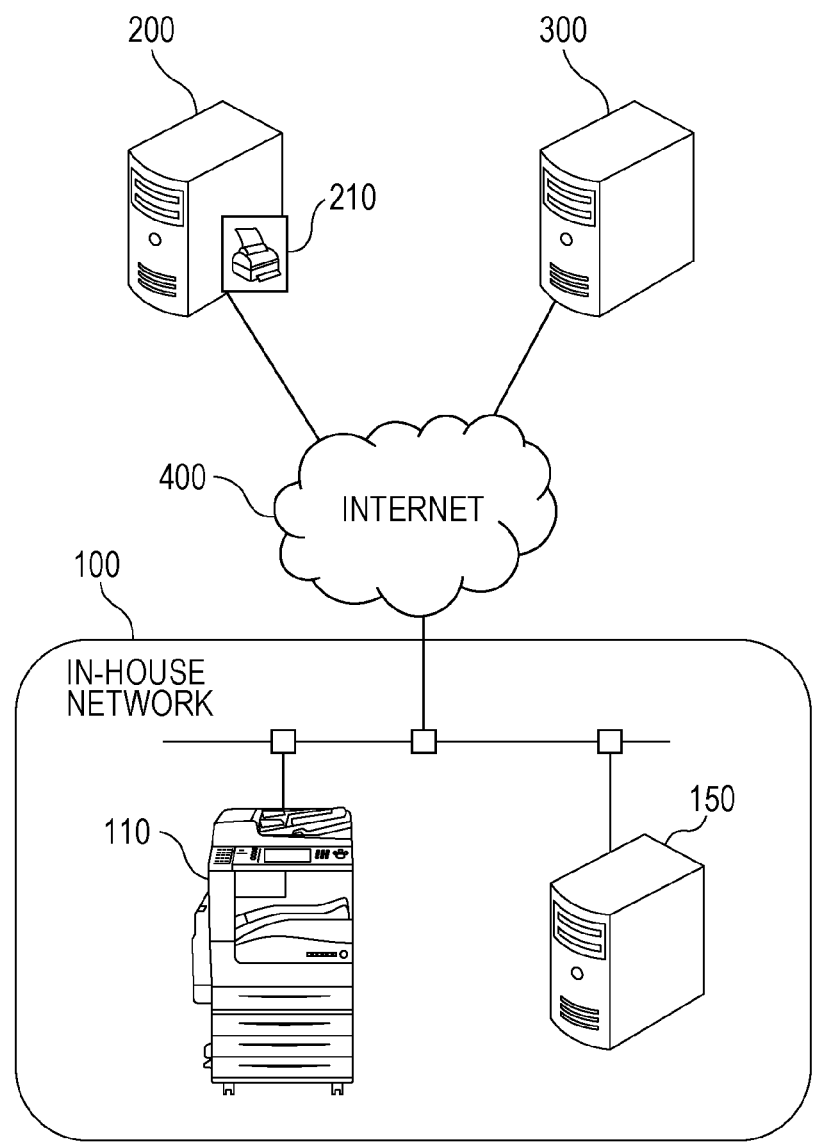
FIG. 1 is a diagram illustrating an example of the configuration of a system according to an exemplary embodiment.

Referring to FIG. 1, an example of the configuration of a system according to an exemplary embodiment will be described. The system described by way of example includes an in-house network 100 in a certain company, a cloud print service 200, and a cloud repository service 300, which are connected to the Internet 400.

The in-house network 100 is configured as, for example, a local area network (LAN). A personal computer (PC), an image forming apparatus 110, an aggregation apparatus 150, and another server are connected to the in-house network 100.

The company described by way of example here is an example of an "organization" including plural users. The PC, the image forming apparatus 110, the aggregation apparatus 150, and the like connected to the in-house network 100 constitute an internal information system in that "organization".

The image forming apparatus 110 is an apparatus that prints, on a sheet, print data input thereto. The image forming apparatus 110 may include functions in addition to a print function. For example, the image forming apparatus 110 may be a so-called digital multifunctional apparatus including, in addition to the print function, a scan function, a copy function, a facsimile sending function, and an email sending function. Although only one image forming apparatus 110 is illustrated in FIG. 1, plural image forming apparatuses 110 may be connected to the in-house network 100. Besides the function of executing a process such as copying, scanning, or printing in response to an instruction from a user, which is accepted by a user interface (UI) unit 112 (see FIG. 2) of the image forming apparatus 110, the image forming apparatus 110 has the function of executing a process such as printing in response to an instruction from a computer in the in-house network 100. Also, the image forming apparatus 110 has the function of obtaining print data from the cloud print service 200 on the Internet 400 and printing and outputting the print data.

Each user (individual in this case) who belongs to the company is allocated a user ID unique in the company (that is, exclusive within the company) (hereinafter referred to as an "in-house ID"). For example, an employee number is an example of such a user ID. The image forming apparatus 110 has the function of performing user authentication using an in-house ID. A user who wants to use the image forming apparatus 110 is asked to present authentication information (such as inputting the in-house ID and password from the UI unit 112, or integrated circuit (IC) card authentication). The image forming apparatus 110 performs user authentication in accordance with the presentation, thereby specifying the in-house ID of that user. The image forming apparatus 110 incorporates the specified in-house ID in log information or the like of an executed process, and records the log information therein or in the aggregation apparatus 150 in the in-house network 100. The recorded log information may be aggregated by the aggregation apparatus 150 for management of the usage of the image forming apparatus 110 or for accounting management. Aggregation is performed for, for example, each user or for each section (department or group in the company) to which the user belongs, on the basis of the in-house ID recorded in each piece of log information.

The cloud print service 200 is a system that provides a print service to a user on a network such as the Internet 400. Although the cloud print service 200 is generally a system including plural computers, the cloud print service 200 may be constituted of a single computer. For example, Google Cloud Print is an example of the cloud print service 200.

The cloud print service 200 provides users with the function of converting, for example, document data (such as document data generated by software such as a word-processing or spreadsheet program) specified by a user to be printed into data in a data format in a page description language that the image forming apparatus 110 is capable of handling (such as Portable Document Format (PDF) or PostScript (registered trademark)), the function of generating a print job corresponding to the accepted print instruction and managing the execution status of that print job (such as queue management), and the like. The cloud print service 200 generates and manages a logical printer 210 (may also be referred to as a "printer object") that realizes various functions for print services. In the logical printer 210, at least one user who uses the logical printer 210 is registered. In general, plural logical printers 210 are held in the cloud print service 200, and each logical printer 210 is used by at least one user who is registered therein.

In addition, at least one physical image forming apparatus 110, which outputs a print job held in a queue in the logical printer 210, may be registered in the logical printer 210. In this case, the logical printer 210 holds management information regarding the registered image forming apparatus 110. The management information includes, for example, identification information (such as a printer name) of the image forming apparatus 110, and capability information that indicates the capability (functions) of the image forming apparatus 110. The capability information includes information indicating, for example, whether the image forming apparatus 110 is capable of performing duplex printing or full-color printing, the sheet sizes held therein, and the like. When the image forming apparatus 110 has a post-processing device, the capability information further includes information regarding the capability of the post-processing device (such as stapling, punching, and folding functions).

The user registers (generates) the user's account in the cloud print service 200. When generating the account, the user registers a user ID (hereinafter referred to as a "cloud ID") that is unique in the cloud print service 200. The cloud print service 200 is a public service, and management of user IDs in the cloud print service 200 is independent of user management in the in-house network 100 of the company. Thus, the cloud ID is generally not the same as the in-house ID. For example, when a user in the company tries to register a user ID including the same character string as that of the in-house ID in the cloud print service 200, the user may not be able to register that user ID because, for example, that user ID has already been allocated to another person.

The cloud print service 200 generates a logical printer 210 in response to an instruction from a user. For each logical printer 210, the cloud print service 200 stores the cloud ID of each user registered as a user who is capable of using that logical printer 210. Alternatively, in response to an instruction to an existing logical printer 210 from a user who has the right to be registered, the cloud print service 200 may register, in the existing logical printer 210, that user as a user who is capable of using the existing logical printer 210.

A user logs in with the user's cloud ID to the cloud print service 200 via the Internet 400 by using a communication protocol such as the Hypertext Transfer Protocol (HTTP) from a PC or a mobile terminal on the Internet 400 (outside the in-house network 100) or from a PC or the image forming apparatus 110 in the in-house network 100, and the user gives a print instruction to a logical printer 210 selected from among one or more logical printers 210 (there may be plural logical printers 210) associated with that cloud ID. The print instruction includes document data to be printed, or information that specifies a target to be printed, such as information that specifies document data to be printed (such as information of the storage location of the document data on the Internet 400 (such as a uniform resource locator (URL))). Here, for example, document data may exist in the cloud repository service 300, which will be described later. In response to the print instruction, the logical printer 210 generates a print job and manages the print job. The print job is a unit for managing the print instruction in the logical printer 210, and the print job is given a unique job ID. In association with the job ID, the logical printer 210 manages information such as information of the document data to be printed, page description language data obtained by converting the document data, the cloud ID of the user who has given the print instruction, and the execution status (such as unexecuted, being executed, execution completed, or error) of the print job.

The logical printer 210 sends the held print job to a printer serving as a physical apparatus at an output destination specified by the user (hereinafter referred to as a "physical printer") and causes the physical printer to print the print job (push method), or, in response to an obtaining request from the physical printer, provides the print job to that physical printer (pull method). For example, since the image forming apparatus 110 in the in-house network 100 is generally behind a firewall, when a print job in the logical printer 210 is to be printed with the image forming apparatus 110, printing is performed using the pull method in which the image forming apparatus 110 accesses the cloud print service 200 using a protocol such as HTTP and obtains the print job.

The cloud repository service 300 is a system that provides users with repository services on the Internet 400. Repository services are services for storing data and programs and are also called "online storage services". Although the cloud repository service 300 is a system that is generally constituted of plural computers, the cloud repository service 300 may be constituted of a single computer. Examples of the cloud repository service 300 include, for example, Google Docs (trademark), Dropbox (trademark), and Evernote (trademark).

For each user, the cloud repository service 300 saves various files such as document data and programs uploaded by the user, and provides the saved files to the user. The user obtains a user ID that is unique in the cloud repository service 300 by registering the user in the cloud repository service 300. Using the user ID, the user logs in to the cloud repository service 300, and uploads and downloads files. In principle, the user ID in the cloud repository service 300 is unrelated to an in-house ID or a user ID (cloud ID) in the cloud print service 200. However, a common user ID is used in services that are related to each other, such as in Google Cloud Print and Google Docs. Hereinafter, a cloud ID that is common to that in the cloud print service 200 is used as a user ID in the cloud repository service 300 in order to simplify the description.

As has been described in the section of the related art, a print job registered in the cloud print service 200 is linked to the cloud ID of the user who has given the print instruction, but is generally not linked to the in-house ID of the user. At the same time, it is expected that there would be more occasions in which the cloud print service 200 is used to perform printing with the image forming apparatus 110 in the in-house network 100. Therefore, it is meaningful to be able to perform recording and aggregation using the in-house IDs of users for printing via the cloud print service 200.

According to the exemplary embodiment, the case is described by way of example in which, when printing is performed with the image forming apparatus 110 in the in-house network 100 via the cloud print service 200, the image forming apparatus 110 gives the in-house ID of a person who gives a print instruction to the cloud print service 200, and, when the cloud print service 200 sends print data to the image forming apparatus 110, the in-house ID is additionally transferred to the image forming apparatus 110.

Because the cloud print service 200 performs user authentication using the cloud ID and does not recognize the in-house ID as a user ID, it is meaningless when the image forming apparatus 110 gives the in-house ID as a user ID to the cloud print service 200. Therefore, according to the exemplary embodiment, the in-house ID is transferred using the inherent function of the cloud print service 200. This inherent function sends setting information for printing, which has been set in the logical printer 210 (for example, information indicating the functions used in printing, such as duplex printing and collation), to a physical printer at an output destination in association with print data.

For example, Google Cloud Print is configured to hold print setting information (referred to as a "print ticket" or a "job ticket") in association with the logical printer 210, and, when providing print date from the logical printer 210 to its physical printer, additionally provide the print setting information. The print setting information may include an element that the user may uniquely define (referred to as a "uniquely defined element"). That is, the setting information including a uniquely defined element including the in-house ID is set in the logical printer 210, and accordingly, the in-house ID may be transferred, together with print data, to the image forming apparatus 110.

Although Google Cloud Print has been described by way of example here, associating an element similar to a print ticket with print data transferred from a logical printer to a physical printer is widely done in the overall printing systems, and the probability of adopting this function in other public print services including other cloud types is high.

As a method of setting print setting information (print ticket) including a uniquely defined element that indicates the in-house ID of a user in the logical printer 210 in the cloud print service 200, there is a method of sending a logical printer generation instruction with which such a print ticket is associated to the cloud print service 200. For example, when the print control technology of the ".NET Framework" (trademark) developed by Microsoft (registered trademark) is used, print setting information is configured as an instance in the PrintTicket class. Upon receipt of a logical printer generation instruction, the cloud print service 200 newly generates a logical printer 210 in which the print ticket is set. In the exemplary embodiment, this method is used by way of example. When an instruction to print document data is given to the logical printer 210 generated in response to the logical printer generation instruction, the logical printer 210 converts the document data into print data in a page description language, and sends the print data, together with the print ticket (including the in-house ID), to the image forming apparatus 110.

As another method, there is a method of generating a logical printer 210 in which, instead of a print ticket, an element including the in-house ID is incorporated in setting information that indicates the capability information of a physical printer associated with the logical printer 210 (the capability information indicating whether the printer is capable of performing, for example, duplex printing and/or color printing). In this method, the image forming apparatus under 110 incorporates an element that indicates the in-house ID in setting information that indicates the capability information thereof, and sends a logical printer generation instruction with which the setting information is associated to the cloud print service 200. In response to the logical printer generation instruction, the cloud print service 200 generates a logical printer 210 in which the setting information is set. When the print control technology of the ".NET Framework" (trademark) is used, the setting information is configured as an instance in the PrintCapability class. In this method, a client apparatus (such as the image forming apparatus 110) that is to perform printing using the logical printer 210 receives, from the logical printer 210, setting information that indicates the capability of a physical printer to be used (such as PrintCapability), and accepts a choice(s) selected by a user from among choices of various functions included in the setting information. The result of the selected choice(s) becomes print setting information for the printing. Here, when an element that indicates the in-house ID is incorporated in the setting information provided to the client apparatus, that element is handed over to the print setting information. The print setting information is sent from the client apparatus to the cloud print service 200 and is set in the logical printer 210. The print setting information (including the in-house ID) is associated with print data sent from the logical printer 210 to the physical printer (such as the image forming apparatus 110 itself).

Both methods use the inherent function of the cloud print service 200, which associates, when the logical printer 210 sends print data to a physical printer such as the image forming apparatus 110, setting information set therein with the print data and sends the setting information and the print data. Therefore, there is no need to change the functions of or add functions to the existing cloud print service 200 in order to realize this mechanism. It is only necessary to add, to the image forming apparatus 110, the function of instructing the cloud print service 200 to generate such a logical printer 210. Hereinafter, an example of the image forming apparatus 110 with this function according to the exemplary embodiment will be described with reference to FIG. 2.

The UI unit 112 is a mechanism for accepting a local operation from a user (such as a direct operation entered by a hand or the like). For example, the UI unit 112 includes input and display hardware such as a touch panel and mechanical buttons. The UI unit 112 exchanges information with a user via the hardware.

An authentication processor 114 performs a process for authenticating a user who locally operates the image forming apparatus 110. The user authentication is performed using an in-house ID instead of a cloud ID. A known method may be used as a method of inputting authentication information to the authentication processor 114. For example, there are various methods, such as the method of inputting an in-house ID and password to the UI unit 112, or the method of performing authentication by communicating with an IC card-type ID card (that stores information of an in-house ID) of a user by using an IC card reader attached to the image forming apparatus 110. When the user authentication performed by the authentication processor 114 is successful, the in-house ID of the user who is operating the image forming apparatus 110 is specified. Alternatively, instead of the authentication processor 114 performing user authentication, the authentication processor 114 may request an authentication server in the in-house network 100 to perform user authentication.

For a user who has been successfully authenticated, a logical printer setting unit 126 performs a process for establishing (such as newly generating), in the cloud print service 200, a logical printer 210 in which setting information including the in-house ID of the user is set. The in-house ID of the user is information known to an image forming unit 120 because of the successful user authentication described above. Therefore, for example, the logical printer setting unit 126 generates setting information (such as a print ticket) including the in-house ID as an element, and sends, to the cloud print service 200, a generation instruction to generate a logical printer 210 that has the setting information as its setting contents. In response to the generation instruction, the cloud print service 200 generates a logical printer 210. In the logical printer 210, the setting information including information of the in-house ID is set.

In order to generate a logical printer 210, the logical printer setting unit 126 needs to log in to the cloud print service 200. This logging in may be performed, in place of the user, by the logical printer setting unit 126 using the cloud ID of the user or using the cloud ID of the image forming apparatus 110 (or the cloud ID of a system administrator, which is held by the image forming apparatus 110). Here, in the former case (logging in in place of the user), needless to say, that user is capable of using the generated logical printer 210. In contrast, in the latter case (logging in with the ID of the image forming apparatus 110), the generated logical printer 210 is owned by the image forming apparatus 110, and, when no change is made, the user who has been authenticated has no right to use the logical printer 210. In this case, the logical printer setting unit 126 registers, in the generated logical printer 210, the cloud ID of the user as a person who has the right to access and use the logical printer 210. The logical printer 210 generated in this manner is unique to the user (since other users are not registered as users of the logical printer 210).

In order to generate a logical printer 2010 for a user and to enable the user to use the generated logical printer 210 for printing, the cloud ID of the user needs to be presented to the cloud print service 200. There are some methods for obtaining the cloud ID of the user.

In one example, the cloud ID may be input by the user to the image forming unit 120, together with authentication information such as the in-house ID for the user authentication. For example, a UI screen of the UI unit 112 for prompting the user to input authentication information (that is, the in-house ID and password) for logging in to the image forming apparatus 110 (and to the in-house network 100) may include a section for inputting the cloud ID, and the user may be prompted to additionally input the cloud ID. At the same time, the user may be prompted to input certificate information such as a password for user authentication in the cloud print service 200.

In another example, the IC card-type ID card may include the cloud ID (and certificate information for the cloud print service 200, which corresponds to the cloud ID). When user authentication using the in-house ID in the ID card is performed via an IC card reader of the image forming apparatus 110, the cloud ID and the like may be obtained from the ID card. In yet another example, the cloud ID corresponding to the in-house ID (and, in some cases, certificate information for the cloud print service 200, which corresponds to the cloud ID) may be registered in a directory service provided in the in-house network 100, and the cloud ID may be obtained from the directory service. In this case, for example, the logical printer setting unit 126 obtains, from the directory service, the cloud ID and the like corresponding to the in-house ID of the user, which is obtained from the authentication processor 114.

The logical printer setting unit 126 generates a logical printer 210 in which setting information including the in-house ID of the user is set by using, for example, the method of generating a logical printer 210 in place of the user by using the cloud ID obtained in this manner, or the method of setting the cloud ID of the user as a user of a logical printer 210 generated with the ID thereof. In the former case, because the user has already been logged in to the cloud print service 200 at the time of generating a logical printer 210, a print instruction unit 128 may afterwards give a print instruction to the logical printer 210 using the name (that is, the cloud ID) of that user. In contrast, in the latter case, before the print instruction unit 128 gives a print instruction to the logical printer 210, the image forming apparatus 110 may send the cloud ID and the like of the user to the cloud print service 200 for logging in, and a print instruction may be given afterwards.

At the time of giving an instruction to generate a logical printer 210, the logical printer setting unit 126 registers, as a physical printer corresponding to the logical printer 210, the image forming apparatus 110 itself in the logical printer 210. Upon the registration, the capability information of the image forming apparatus 110 may be set in the logical printer 210. With this registration, a unique physical printer ID (that is, an ID that uniquely identifies a physical printer) is given from the cloud print service 200 to the image forming apparatus 110. By presenting the physical printer ID to the cloud print service 200, the image forming apparatus 110 certifies that the image forming apparatus 110 is a physical printer registered in the logical printer 210, and obtains a print job held in the logical printer 210.

In the case of the method of sending a logical printer generation instruction including a print ticket from the logical printer setting unit 126 to the cloud print service 200, upon generation of a logical printer 210 in the cloud print service 200, print settings (association of the print ticket with the logical printer 210) are completed. When a print instruction is input to the logical printer 210, print data to be printed is only necessary to be sent, in association with the print ticket, to the image forming apparatus 110. That is, in this case, the print instruction unit 128 of the image forming apparatus 110 does not need to perform print settings, which will be described later.

Alternatively, in the case of the method of sending a logical printer generation instruction including the capability information of the image forming apparatus 110, instead of a print ticket, from the logical printer setting unit 126 to the cloud print service 200, the capability information it set as setting information in a logical printer 210 generated in response to this logical printer generation instruction. The setting information is provided to the image forming apparatus 110 for enabling the print instruction unit 128 to perform operations regarding print settings, and the print instruction unit 128 accepts print settings entered from a user on the basis of the setting information and generates a print ticket. The print ticket is sent to the cloud print service 200 and is associated with the logical printer 210. When print data is provided from the logical printer 210 to the image forming apparatus 110, the print ticket is also provided.

At the time the user finishes using the logical printer 210 which has been generated for the user, the logical printer setting unit 126 may delete the logical printer 210. "At the time the user finishes using" the logical printer 210 may take various instances. For example, after the logical printer 210 has been generated, the user may have finished using the logical printer 210 upon successful completion of obtaining of a print job from the logical printer 210. Alternatively, the user may finish using the logical printer 210 upon completion of printing of the obtained print job. In these examples, the logical printer 210 is deleted upon printing of a document. When plural documents are to be printed, one logical printer 210 is generated for printing each document.

In another example, the point at which user authentication by the authentication processor 114 of the image forming apparatus 110 is canceled is understood as the point at which the user no longer uses the image forming apparatus 110, that is, the user has finished using the logical printer 210. Cancellation of user authentication is performed when, for example, the user explicitly performs an operation to cancel authentication (logging out), or when no user operation is performed on the image forming apparatus 110 over a predetermined time after completion of a print job in response to a user instruction (timeout).

Whether to generate and delete a logical printer 210 for each document, or whether to delete a logical printer 210 after cancellation of authentication may be selectable in accordance with the settings of the image forming apparatus 110 or in response to an instruction from each user.

The print instruction unit 128 is a unit that gives an instruction to perform printing using the logical printer 210 generated by the logical printer setting unit 126. Here, copying a document set in the image forming apparatus 110 or printing document data or the like in a document server in the in-house network 100 basically does not involve usage of the cloud print service 200 outside the in-house network 100. Mainly, conceivable occasions in which the cloud print service 200 is used include occasions to print document data in a data storage apparatus (as a representative thereof, the cloud repository service 300 is illustrated by way of example in FIG. 1) outside the in-house network 100. In this case, the print instruction unit 128 logs in to the cloud repository service 300 with the ID of a user (in this example, logging in is possible with the same ID as the cloud ID in the cloud print service 200 as described above), and obtains a list of pieces of document data registered by the user in the cloud repository service 300. The obtained list is displayed on the UI screen of the UI unit 112, and the user is prompted to select at least one piece of document data to be printed from the list. The print instruction unit 128 generates a print instruction that includes information for specifying each piece of document data selected to be printed and that specifies the logical printer 210 generated previously as a print destination, and sends the print instruction to the cloud repository service 300. The print instruction includes, as information for specifying the logical printer 210, information for specifying the cloud print service 200 (domain name or the like) and the ID of the logical printer 210 in the cloud print service 200. Of these pieces of information, the information for specifying the cloud print service 200 is registered in advance in the image forming apparatus 110 (for the necessity to access the cloud print service 200). In contrast, the ID of the logical printer 210 is provided upon an instruction made by the logical printer setting unit 126 to generate a logical printer 210, from the cloud print service 200, which has generated the logical printer 210 in response to that instruction, to the logical printer setting unit 126 as a response to that instruction.

Also, when accepting at least one document selected by the user to be printed, the print instruction unit 128 may obtain setting information (capability information) of a physical printer to be used this time (that is, the image forming apparatus 110), which is set in the logical printer 210, generate, on the basis of the setting information, a screen for accepting an input of print settings for printing of the document(s) to be printed and display the generated screen on the UI unit 112, and accept an input of print settings. When an instruction to generate a logical printer 210 has been made using, as a parameter, capability information of the physical printer instead of using a print ticket (print setting information), such print settings are made when an instruction to print the document(s) is made. As has been described above, the setting information (capability information) of the logical printer 210 includes information of choices of the individual functions of the image forming apparatus 110, such as duplex/simplex, color/monochrome, usable sheet sizes, and stapling/no stapling. The setting information (capability information) of the logical printer 210 further includes information of the in-house ID. The logical printer 210 presents the setting information to the print instruction unit 128. On the basis of the setting information, the print instruction unit 128 displays, on the UI unit 112, a UI screen including an input unit for selecting one from the choices of each function and an input unit for inputting a numeral such as the number of prints to be made, thereby prompting the user to select one from the choices of each function and to input a numeral. The results of such selected choices and input numeral become print settings for printing this time. The print instruction unit 128 generates a print ticket that indicates the contents of the print settings. Since the setting information of the logical printer 210, which has been obtained from the logical printer 210, includes an element that indicates the in-house ID, the element indicating the in-house ID may be left in the print ticket which has been generated on the basis of the setting information. The generated print ticket may be incorporated in a print instruction for the cloud repository service 300 and may be set in the logical printer 210 in the cloud print service 200 via the cloud repository service 300, or may be directly set in the logical printer 210.

In the above-described example in which generation and print settings of the logical printer 210 are done at the same time using a print ticket including the in-house ID, it is unnecessary to input print settings at the print instruction unit 128, which has been described here (and, in response to this, transfer of the print ticket to the logical printer 210). However, print settings may be made at the print instruction unit 128 when the user wants to make settings different from print settings made upon generation of the logical printer 210.

Upon receipt of the print instruction, the cloud repository service 300 gives, by using information included in the print instruction, a print instruction that specifies the selected document data to be printed, to the logical printer 210 in the cloud print service 200.

Upon receipt of the print instruction, the logical printer 210 converts each piece of the selected document data into print data in a page description language that the image forming apparatus 110 is capable of handling (such as data in the PDF format), and provides information of a print job including the print data and the print ticket set in the logical printer 210 to the image forming apparatus 110. The print ticket includes the in-house ID of the user, which is included in the setting information set in the logical printer 210. Alternatively, the information of the print job provided from the logical printer 210 to the image forming apparatus 110 may include, instead of the entity data of the print data and/or the print ticket, information such as a URL for obtaining these pieces of entity data. Such information of the print job is received by a job receiving unit 118 of the image forming apparatus 110 and is conveyed to a job management unit 116.

The job management unit 116 generates a job in response to a local processing instruction from the UI unit 112 to the image forming apparatus 110 or a processing instruction from a remote apparatus via a network, and manages execution of the job.

The user who has been authenticated is enabled to give various processing instructions, such as copying and scanning instructions, from the UI unit 112. In response to such a processing instruction, the job management unit 116 generates a job for managing the processing, and performs job management such as queue management. The job management unit 116 controls each device of the image forming apparatus 110 to execute the job. For example, upon receipt of a copying instruction, a scanner in the image forming apparatus 110 is activated to read a document, and the image forming unit 120 prints, on a sheet, an image obtained as a result of reading the document.

The job management unit 116 receives, at the job receiving unit 118, print data from another apparatus (including the cloud print service 200 on the Internet 400) via the in-house network 100, and generates and manages a job corresponding to the print data. When that job becomes the top item in the execution order, the job management unit 116 causes the image forming unit 120 to print the print data of the job on a sheet.

The job management unit 116 receives print data corresponding to the print instruction received by the job receiving unit 118 from the cloud print service 200 and a print ticket, generates a job regarding the print data, and causes the image forming unit 120 to execute the job (that is, causes the image forming unit 120 to perform printing). Here, a setting extraction unit 117 extracts the value of the in-house ID included in the print ticket. The extracted in-house ID is used for recording a log or the like. Alternatively, the setting extraction unit 117 may extract information of print settings from the print ticket, and the job management unit 116 may control the image forming apparatus 110 to perform an operation in accordance with the print settings.

A log recording processor 122 records, in a log memory 124, processing log information of each job executed under management of the job management unit 116. The recorded log information includes information of the in-house ID of a user who has given an instruction to execute the job. The log information further includes information of various items that are generally recorded in the field of processing log management of image forming apparatuses, such as the job execution time and date, print setting information in the case of printing (duplex printing or not, color printing or monochrome printing, etc.), and the number of prints made. The log information of each job, which is stored in the log memory 124, is used for aggregation of the amount of usage of the image forming apparatus 110 by each section or each user in the company or the fees for each section or each user in the company. The aggregation is performed by, for example, the aggregation apparatus 150 in the in-house network 100. In the aggregation, for each piece of log information stored in the log memory 124, a user who has executed a job regarding the log information and, as occasion calls, a section to which the user belongs are specified on the basis of the in-house ID included in the log information. The amount of usage, such as the number of prints made in the job (or the fees in accordance with the amount of usage), is added to the aggregated value of the amount of usage (fees) of the specified user and section.

In the log memory 124, the in-house ID in the job is recorded as an ID for specifying the user who has given the job instruction. Accordingly, the amount of usage (fees) may be aggregated for each user or for each section by referring to in-house organization information.

In the case of a local processing instruction or a processing instruction from another apparatus in the in-house network 100, information of the processing instruction includes the in-house ID of a user who has given the instruction. Thus, the log recording processor 122 may only need to incorporate that in-house ID in the log information and to record the log information.

In contrast, for print data sent from the logical printer 210 in the cloud print service 200 to the image forming apparatus 110, it is only necessary to incorporate, in the log information, an in-house ID extracted by the setting extraction unit 117 from a print ticket that accompanies the print data.

Figure 2:
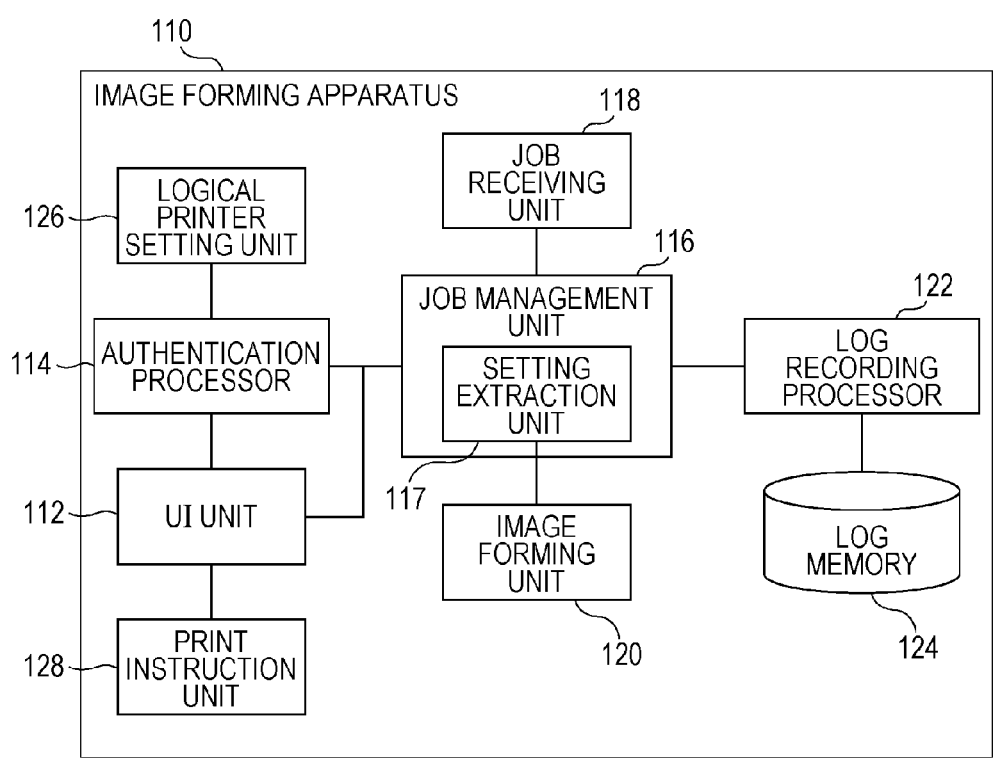
FIG. 2 is a diagram illustrating an example of the functional configuration of an image forming apparatus according to the exemplary embodiment.

In the example illustrated in FIG. 2, the log memory 124 is provided in the image forming apparatus 110. Alternatively, the log memory 124 may be provided in another apparatus (such as the aggregation apparatus 150) in the in-house network 100, and the log recording processor 122 may write log information in that apparatus.

The configuration and functions of the image forming apparatus 110 according to the exemplary embodiment have been described above. Next, an example of the flow of a printing process using the cloud print service 200 from the image forming apparatus 110 will be described.

Figure 3:
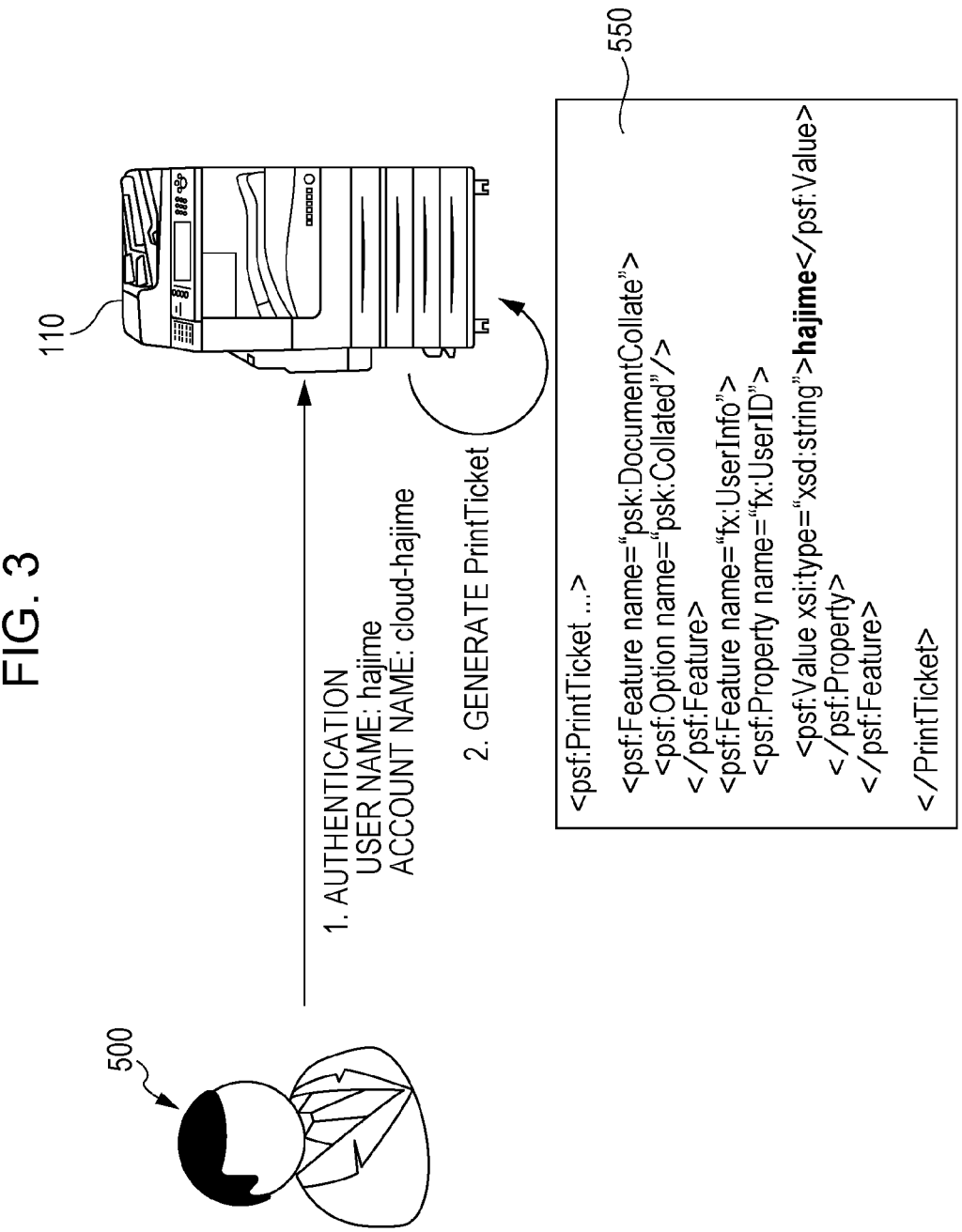
FIG. 3 is a diagram illustrating a portion of the flow of a printing process according to the exemplary embodiment.

As illustrated in FIG. 3, a user 500 who wants to print document data in the cloud repository service 300 by using the cloud print service 200 goes to the nearest image forming apparatus 110 in the in-house network 100, and (1) the user 500 performs a user authentication operation on the image forming apparatus 110. Upon the user authentication operation, the user 500 inputs (by hand or by presenting an IC card-type employee ID card) the in-house ID (the user name "hajime" in the illustrated example) and the cloud ID (the account name "cloud-hajime" in the illustrated example) to the authentication processor 114 of the image forming apparatus 110. As described previously, user authentication on the image forming apparatus 110 is performed on the basis of the in-house ID. Although the user 500 additionally inputs the cloud ID in this example, the cloud ID may be obtained from an in-house directory server.

When the user authentication is successful, in the example illustrated in FIG. 3, (2) the logical printer setting unit 126 generates, as a PrintTicket 550, setting information of a logical printer 210 to be generated. The PrintTicket 550 in this example is written in an eXtensible Markup Language (XML) and is generated as, for example, an instance in the PrintTicket class used in the print control technology of the ".NET Framework" (trademark) developed by Microsoft (registered trademark). The PrintTicket class defines print settings (configuration space of a device to be used in the job) to be applied to a print job serving as a target. Here, the PrintTicket class is appropriated to the settings of a logical printer 210 to be generated. For example, the description of the second and third rows from the top of the PrintTicket 550 illustrated in FIG. 3 indicates that the choice "psk:Collated" (perform collation) is selected with regard to the function named "psk:DocumentCollate" (collation of print output) of the image forming apparatus 110. That is, in a print job to which the PrintTicket 550 is applied, the image forming apparatus 110 is instructed to collate the printed sheets. After the user authentication, the image forming apparatus 110 displays a screen for inputting print settings, accepts an input of print settings from the user 500, and incorporates the print settings in such a form in the PrintTicket 550.

The fifth to ninth rows from the top of the PrintTicket 550 illustrated in FIG. 3 are elements describing the in-house ID of the user 500. In this example, the element named "fx:UserInfo" which indicates user information includes the element named "fx:UserID" which indicates the in-house ID attribute, and the in-house ID attribute element includes an element including the character string "hajime" which is the value of the in-house ID. The cloud print service 200 need not understand the contents of these elements in the fifth to ninth rows or execute control in accordance with the contents. These elements in the fifth to ninth rows may be elements that are uniquely defined on the in-house network 100 side.

The cloud print service 200 sets the PrintTicket 550 in the generated logical printer 210. In response to a print instruction given to the logical printer 210 afterwards, it is only necessary for the cloud print service 200 to associate the PrintTicket 550 with print data generated in response to the print instruction and to provide the PrintTicket 550 and the print data to the image forming apparatus 110.

Figure 4:
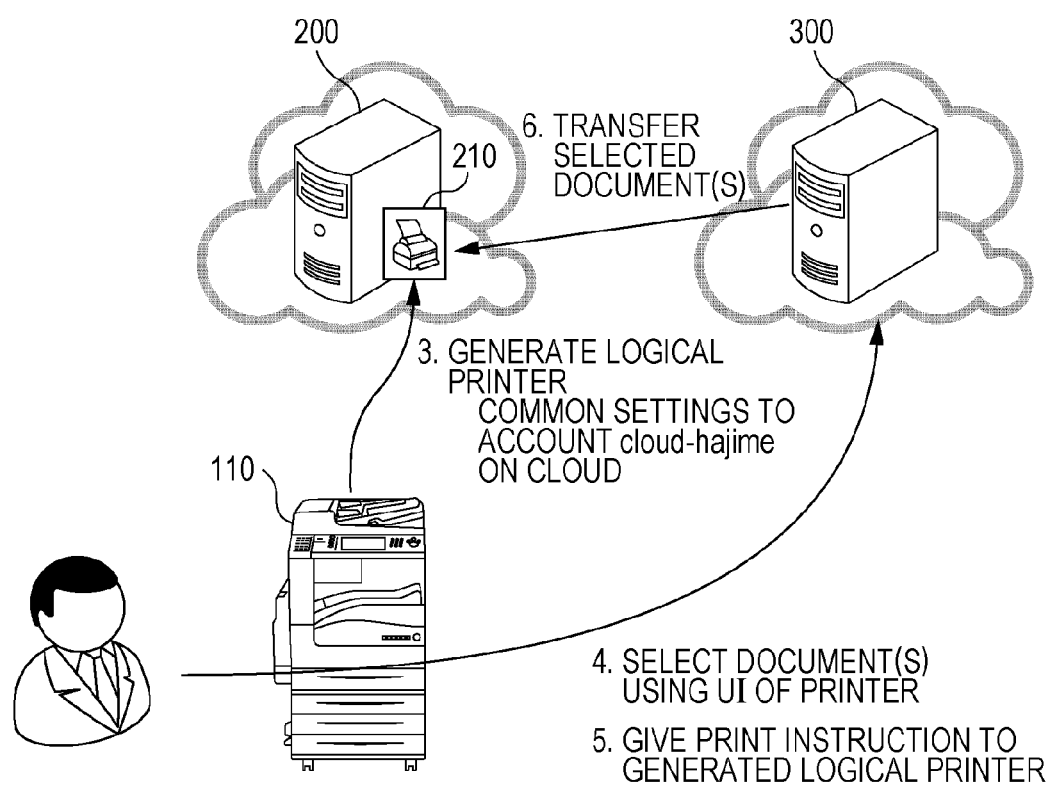
FIG. 4 is a diagram illustrating a portion of the flow of the printing process according to the exemplary embodiment.

When the PrintTicket 550 is generated, as illustrated in FIG. 4, (3) the logical printer setting unit 126 of the image forming apparatus 110 sends the PrintTicket 550 together with an instruction to newly generate a logical printer 210 to the cloud print service 200. Upon receipt of the instruction, the cloud print service 200 newly generates a logical printer 210 and sets the PrintTicket 550 in the generated logical printer 210 (for example, the cloud print service 200 saves the PrintTicket 550 in association with the ID of the logical printer 210). The PrintTicket 550 includes the in-house ID "hajime" of the user 500 who has been authenticated in the above (1). Also, the logical printer setting unit 126 sets, in the logical printer 210, the cloud ID "cloud-hajime" of the user 500, which has been obtained in the user authentication in the above (1), as a person (such as a sharer) who has the right to use the logical printer 210.

Next, (4) the print instruction unit 128 logs in to the cloud repository service 300 using the cloud ID "cloud-hajime" and gives an instruction to search for document data that "cloud-hajime" has the right to print from among pieces of document data saved in the cloud repository service 300. In response to this instruction, the cloud repository service 300 executes the search and provides a list of pieces of document data obtained as a result of the search to the print instruction unit 128. This list is provided as, for example, a webpage for selecting a document(s) and giving a print instruction. The print instruction unit 128 displays the list on the screen of the UI unit 112, and accepts at least one document selected, from the list, by the user 500 to be printed.

When the user 500 finishes selecting at least one piece of document data to be printed and inputs an instruction to execute printing to the UI unit 112, (5) the print instruction unit 128 sends a print instruction including information indicating the selected piece(s) of document data and information specifying the logical printer 210 (generated in the above (3)) in the cloud print service 200, which performs printing, to the cloud repository service 300.

(6) In response to the print instruction, the cloud repository service 300 sends a print instruction including the selected piece(s) of document data (or information such as a URL for specifying the selected piece(s) of document data) to the specified logical printer 210.

Figure 5:
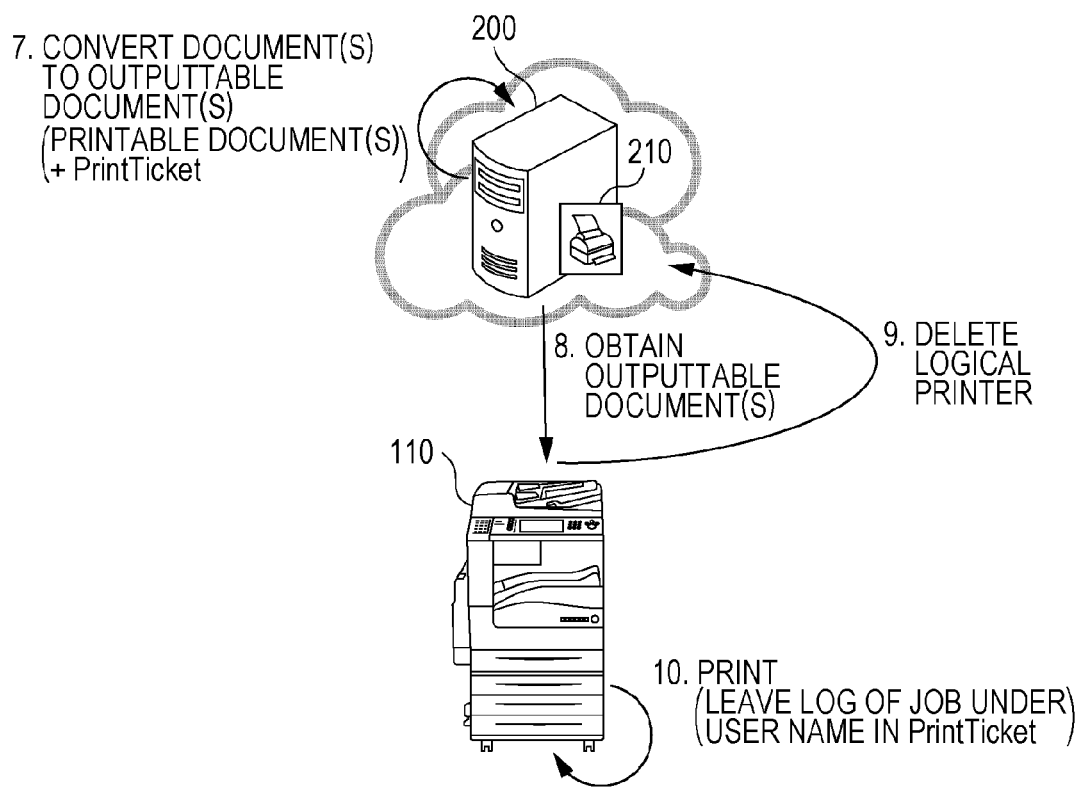
FIG. 5 is a diagram illustrating a portion of the flow of the printing process according to the exemplary embodiment.

Upon receipt of the print instruction, as illustrated in FIG. 5, (7) the logical printer 210 converts the document data to be printed into print data in a data format such as PDF that is printable with the image forming apparatus 110 (indicated as a "printable document(s)" in FIG. 5). The logical printer 210 generates outputtable document data including the print data and the PrintTicket 550 set in the logical printer 210.

(8) The generated outputtable document data is provided from the logical printer 210 to the image forming apparatus 110. When the image forming apparatus 110 is behind the firewall of the in-house network 100 and the logical printer 210 is incapable of sending the outputtable document data across the firewall to the image forming apparatus 110, the following may be performed. For example, the logical printer 210 sends a message indicating that the outputtable document data has been prepared to the image forming apparatus 110 at an output destination by using a protocol that may go through the firewall. Upon receipt of the message, the image forming apparatus 110 requests the logical printer 210 for the outputtable document data by using a protocol that may go through the firewall, such as HTTP, and obtains the outputtable document data as a response in response to the request. Since the address of the image forming apparatus 110 has been registered in the logical printer 210 at the time the logical printer 210 has been generated, the logical printer 210 may send a message to the image forming apparatus 110 by using that address. Alternatively, for example, the image forming apparatus 110 may periodically access the logical printer 210 by using a protocol such as HTTP (polling), and may obtain outputtable document data if there is any outputtable document data addressed to the image forming apparatus 110.

(9) In the example illustrated in FIG. 5, at the time (or immediately after) the image forming apparatus 110 normally completes obtaining of the outputtable document data from the logical printer 210, the image forming apparatus 110 gives an instruction to the cloud print service 200 to delete the logical printer 210. The timing of deleting the logical printer 210 is not limited to this example. As has been described above, the logical printer 210 may be deleted upon cancellation of the user authentication. Anyway, the logical printer 210 is deleted at the time the user 500 who has given the print instruction finishes using the logical printer 210.

If the generated logical printer 210 is not deleted, the logical printer 210 may be used by a different user by using some way. In that case, even though the logical printer 210 has been used by the different user, it is recorded in the log memory 124 that the logical printer 210 has been used by the user 500 with the in-house ID included in the settings in the logical printer 210. In contrast, as in the above (9), when the logical printer 210 is immediately deleted after the user 500 finishes using the logical printer 210, such abuse of the logical printer 210 by third person is prevented.

(10) The image forming apparatus 110, which has obtained the outputtable document data, performs printing on a sheet in accordance with the data. The image forming apparatus 110 records log information of the printing in the log memory 124. In the log information, the value of the in-house ID included in the PrintTicket 550 in the outputtable document data is recorded as a user ID item indicating the user who has given the print instruction. In this way, the printing is recorded as being performed by the user with that in-house ID, and the aggregation apparatus 150 performs aggregation in accordance with that in-house ID.

As has been described above, according to the exemplary embodiment, with the use of the mechanism of the cloud print service 200 in which setting information such as the PrintTicket 550 set in the logical printer 210 is provided, together with print data, to the image forming apparatus 110, the in-house ID of a user that is inherently not under management of the cloud print service 200 is provided in association with print data to the image forming apparatus 110.

According to the exemplary embodiment, the logical printer 210 is deleted at the time the use of the logical printer 210 including the in-house ID of the user is finished. Therefore, the risk of the logical printer 210 being used by people other than that user is very low.

According to the exemplary embodiment, information of print settings in which the functions of the image forming apparatus 110 at the time the user performs printing are reflected is included in the PrintTicket 550 and set in the logical printer 210. Therefore, the logical printer 210 functions as a printer that reflects the latest functions of the image forming apparatus 110 at that time.

In the above-described example illustrated in FIGS. 3 to 5, the print instruction unit 128 presents, from the UI unit 112 of the image forming apparatus 110, a list of documents only on the cloud repository service 300 to the user and accepts a document(s) selected by the user to be printed. However, this is only an example. Alternatively, the print instruction unit 128 may obtain a list of documents that the user has the right to print from document servers on the cloud repository service 300 and the in-house network 100, display the list of the documents saved outside and inside the company on the UI unit 112, and accept a document(s) selected from the list to be printed. In this case, when a document on the cloud repository service 300 is selected to be printed, printing is performed using the cloud print service 200 in the above-described manner. When a document on the in-house server is selected, the image forming apparatus 110 obtains the document from the server and prints the document by using an existing method.

In the example illustrated in FIGS. 3 to 5, when the user 500 performs user authentication on the image forming apparatus 110, the logical printer setting unit 126 automatically generates a logical printer 210 for that user 500 in the cloud print service 200. However, this is only an example. Alternatively, even when the user authentication is successful, a logical printer 210 may not be immediately generated. Instead, a logical printer 210 may be generated only after the cloud print service 200 is selected in a function menu of the UI unit 112. In this example, no logical printer 210 is generated when a menu item other than the cloud print service 200, such as copying or printing of a document on a document server on the in-house network 100, is selected. In this example, at the time of the user authentication, the user 500 may not be asked to input the cloud ID. The user 500 may be asked to input the cloud ID only when the cloud print service 200 is selected.

Figure 6:
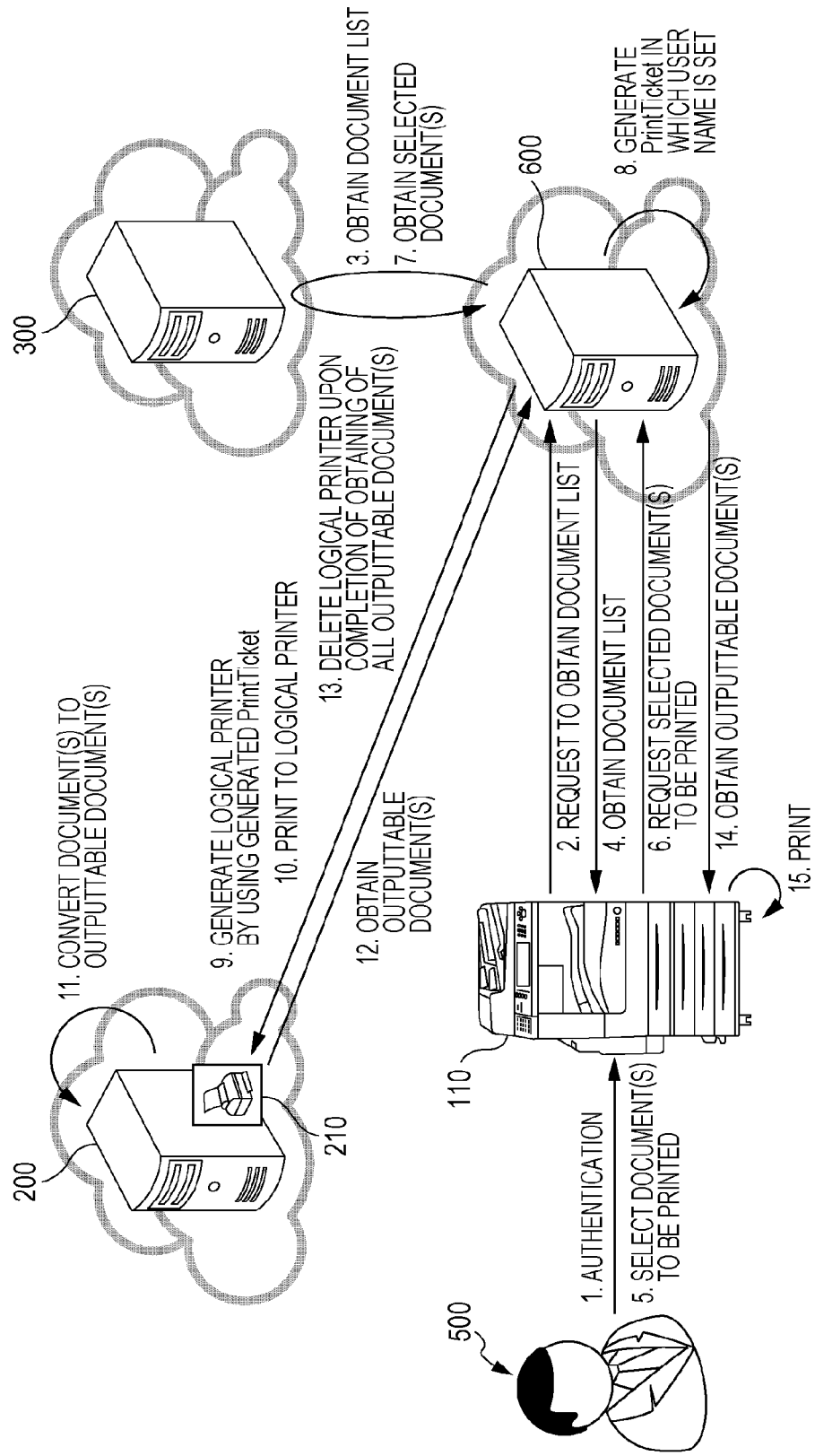
FIG. 6 is a diagram illustrating the configuration of a system and the flow of a printing process according to a modification.

Next, referring to FIGS. 6 and 7, a modification of the above-described exemplary embodiment will be described. A system according to this modification includes an intermediary apparatus 600. The intermediary apparatus 600 is realized as a system, outside the image forming apparatus 110, which has the functions (such as the logical printer setting unit 126 and the print instruction unit 128) included in the image forming apparatus 110 in the above-described exemplary embodiment for exchanging information with the cloud print service 200 and the cloud repository service 300. When performing printing using the cloud print service 200, the image forming apparatus 110 requests the intermediary apparatus 600 to perform processing for the printing.

The intermediary apparatus 600 may be realized as a service (configured as a single server or a cloud system including plural computers) on the Internet 400 or a server on the in-house network 100. Alternatively, a computer that serves the functions of the intermediary apparatus 600, which will be described below, may be included in a housing of the image forming apparatus 110.

Figure 7:
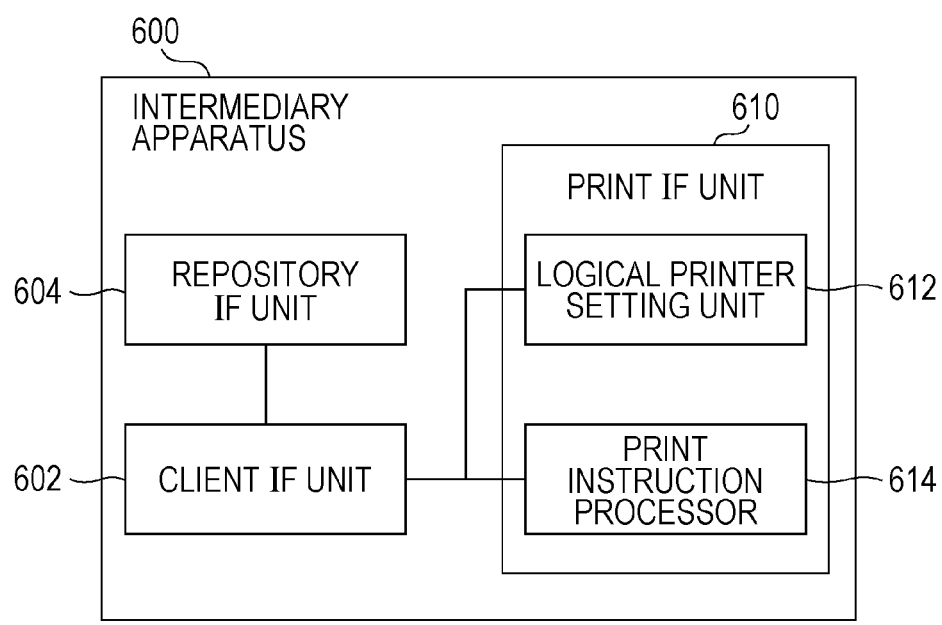
FIG. 7 is a diagram illustrating an example of the functional configuration of an intermediary apparatus according to the modification.

As illustrated in FIG. 7, the intermediary apparatus 600 includes a client interface (IF) unit 602, a repository IF unit 604, and a print IF unit 610. The client IF unit 602 is a function module that performs communication and processing with a client apparatus (that is, the image forming apparatus 110 in this case) necessary for realizing printing via the cloud print service 200. The client IF unit 602 provides an interface for printing using a cloud from the image forming apparatus 110 in the form of, for example, a Web service. The repository IF unit 604 is a function module that performs communication and processing with the cloud repository service 300. The print IF unit 610 is a function module that performs communication and processing with the cloud print service 200. The print IF unit 610 includes a logical printer setting unit 612 and a print instruction processor 614, which have functions that are the same as or similar to the logical printer setting unit 126 and the print instruction unit 128 of the image forming apparatus 110 according to the exemplary embodiment.

Referring back to FIG. 6, (1) when the user 500 comes to the image forming apparatus 110 to be successfully authenticated, and selects execution of printing using the cloud print service 200 from the UI screen of the image forming apparatus 110, (2) the image forming apparatus 110 sends a request for obtaining a document list for printing to the intermediary apparatus 600. This request for obtaining a document list gives an instruction to start a print session using the cloud print service 200, and information of this request includes the in-house ID and the cloud ID of the user 500 who has been confirmed by the user authentication. (3) When the client IF unit 602 of the intermediary apparatus 600 receives this request, the repository IF unit 604 logs in, with the cloud ID of the user 500, to the cloud repository service 300 which has been set in advance, and obtains a list of documents that the user 500 has the right to print from among documents saved in the cloud repository service 300. (4) The obtained document list is provided from the client IF unit 602 to the image forming apparatus 110. (5) The image forming apparatus 110 displays the document list on the UI screen, and accepts at least one document selected by the user 500 to be printed. (6) Upon acceptance of the selected document(s), the image forming apparatus 110 sends an instruction to print the selected document(s) to the intermediary apparatus 600. (7) In the intermediary apparatus 600 which has received the print instruction, the repository IF unit 604 obtains the entity data of the selected document(s) from the cloud repository service 300.

(8) The logical printer setting unit 612 in the intermediary apparatus 600 generates a print ticket 550 including an element that indicates the in-house ID ("user name") of the user 500, which has been obtained in the above step (2). Alternatively, for example, at the time at which at least one document is selected to be printed in the above-described (5), an input of print settings from the user 500 may be accepted, the print settings may be sent, together with the print instruction in the above-described (6), to the intermediary apparatus 600, and the logical printer setting unit 612 may incorporate information of the print settings in the print ticket 550.

(9) An instruction to generate a logical printer 210 with which the print ticket is associated is sent to the cloud print service 200. Accordingly, a logical printer 210 for this printing for the user 500 is generated in the cloud print service 200. The print ticket is set in the logical printer 210. The logical printer setting unit 612 sets, as a user who uses the generated logical printer 210, the cloud ID of the user 500 in the logical printer 210. (10) When the logical printer 210 is generated, the print instruction processor 614 of the intermediary apparatus 600 sends, to the logical printer 210, a print instruction including each piece of document data obtained in the above-described (7) as data to be printed.

(11) Upon receipt of the print instruction, the logical printer 210 converts, for each document to be printed, the document data into print data that the image forming apparatus 110 is capable of handling, and adds the print ticket set in the logical printer 210 to the print data, thereby generating an outputtable document.

(12) When the outputtable document to be printed is generated, the print instruction processor 614 of the intermediary apparatus 600 obtains the outputtable document (or the cloud print service 200 transfers the generated outputtable document to the intermediary apparatus 600). This obtaining (or transfer) is repeated the number of documents selected to be printed. (13) Upon completion of the obtaining of outputtable documents for all the documents, the logical printer setting unit 612 of the intermediary apparatus 600 gives an instruction to the cloud print service 200 to delete the logical printer 210 generated in the above-described (9).

(14) Every time the client IF unit 602 of the intermediary apparatus 600 obtains an outputtable document in the above-described (12), the client IF unit 602 provides the outputtable document to the image forming apparatus 110. When the intermediary apparatus 600 is outside the in-house network 100, the outputtable document is provided as follows. For example, a message that the outputtable document has been prepared is sent to the image forming apparatus 110 by using a protocol that goes through the firewall of the in-house network 100. In response to the message, the image forming apparatus 110 requests the intermediary apparatus 600 for the outputtable document by using HTTP or the like and obtains the outputtable document. (15) When the outputtable document is obtained, the image forming apparatus 110 prints the outputtable document. The image forming apparatus 110 extracts the in-house ID from the print ticket in the outputtable document, incorporates the in-house ID in log information of the printing, and records the log information.

In the above example, the intermediary apparatus 600 provides the outputtable document, which has been obtained from the cloud print service 200, to the image forming apparatus 110 without changing the outputtable document. This mechanism works only when the image forming apparatus 110 conforms to a print schema such as the print ticket included in the outputtable document. In conceivable cases, the image forming apparatus 110 may not conform to the print schema because, for example, the image forming apparatus 110 is of an old type. In such a case, the intermediary apparatus 600 may convert the outputtable document (particularly the print ticket included therein) into a format to which the image forming apparatus 110 in the in-house network 100 conforms, and provide the converted outputtable document to the image forming apparatus 110.

As above, the example of the system including the intermediary apparatus 600 has been described. In the above example, upon completion of the obtaining of the outputtable document(s) for all the document(s) selected by the user 500, the intermediary apparatus 600 deletes the logical printer 210. However, this is only an example. For example, after the user 500 selects at least one document to be printed and gives a print instruction, the user 500 may continuously select another document(s) to be printed and give the next print instruction. In such a case, if the logical printer 210 is deleted every time the obtaining of the to-be-printed document(s) in each print instruction is completed, the logical printer 210 is generated again for the next print instruction. To avoid such inconvenience, as in the above-described exemplary embodiment, the intermediary apparatus 600 may delete the logical printer 210 in response to detection that the user 500 no longer uses the image forming apparatus 110 as explicit authentication cancellation or timeout.

In this modification, with the intermediary apparatus 600 as above being provided, log information including the in-house ID is recorded for printing using the cloud print service 200 without adding particular changes to the existing image forming apparatus 110 (if there is any change, the item "printing using the cloud" in an operation menu is associated with the URL of the intermediary apparatus 600 and is stored).

Since the intermediary apparatus 600 is aware of the number of document(s) requested by the image forming apparatus 110 to be printed in the above-described (6), the intermediary apparatus 600 may recognize completion of the obtaining (or print output) of that number of outputtable document(s) from the cloud print service 200, and, upon the completion, give an instruction to the cloud print service 200 to delete the logical printer 210.

In the above-described exemplary embodiment in which the image forming apparatus 110 performs management for printing using a cloud, there may be occasions in which a print instruction for the cloud repository service 300 is sent as an HTTP request from a Web browser of the UI unit 112. In such occasions, the Web browser is only sending HTTP requests; the Web browser does not analyze the number of document(s) specified to be printed in each request. Unlike the intermediary apparatus 600, the image forming apparatus 110 may not be able to determine whether all the pieces of selected document data have been obtained from the cloud print service 200. In such a case, a print instruction for documents selected at one time may be handled by the method of deleting the logical printer 210 upon detection that the user 500 no longer uses the image forming apparatus 110. Alternatively, such a case may be handled by including the functions of the intermediary apparatus 600 in the image forming apparatus 110.

The exemplary embodiment and the modification described above are examples in the case where the user IDs for the cloud print service 200 and the cloud repository service 300 are the same. However, the mechanisms in the exemplary embodiment and the modification are applicable to other cases. In such cases, for example, the user ID for the cloud repository service 300 may be input by a user or may be read from an IC card. Alternatively, a directory service in the in-house network 100 may be searched for the user ID for the cloud repository service 300 which corresponds to the authenticated in-house ID.

In the foregoing, when a user performs printing using a cloud, a logical printer 210 for the user is "generated", and that logical printer is "deleted" upon finishing the printing. However, this is only an example. Instead, with the cloud ID of the administrator of the in-house network 100 or the cloud ID of the image forming apparatus 110, a logical printer 210 associated with the image forming apparatus 110 may be generated in the cloud print service 200. When performing printing using a cloud, each user may use that logical printer 210 as the user's logical printer 210. In this case, the logical printer setting unit 126 or 612 sends setting information (such as a print ticket) including, as an element, the in-house ID of the user authenticated by the image forming apparatus 110 to the cloud print service 200, thereby updating the setting information in the logical printer 210 associated with the image forming apparatus 110. With this updating process, the logical printer 210 has the setting information including the in-house ID of that user. When that logical printer 210 is used, the print ticket including the in-house ID of that user is transferred, together with print data, to the image forming apparatus 110. Also in this example, when the user has finished using the logical printer 210 (such as when the image forming apparatus 110 completes obtaining of an outputtable document(s) or when the authentication of the user in the image forming apparatus 110 is cancelled), the setting information is updated so that at least the in-house ID is deleted from the setting information in the logical printer 210. In this updating process, the cloud ID of that user may be deleted from the settings of a person (sharer) who has the right to use the logical printer 210. With such processing, even if the logical printer 210 is used by a different person after the use by the former user, the processing log of the use by the different person will not be recorded under the name of the former user.

Handling of Temporary ID

In the above example, it has been described that a user who uses the image forming apparatus 110 has an in-house ID. However, there may be cases in which a user who does not have an in-house ID uses the in-house image forming apparatus 110. One example is the case in which a visitor to the company is permitted to use the image forming apparatus 110. In addition, the case where an employee user has forgotten to bring his/her IC card type ID card used for authentication using his/her in-house ID corresponds to such cases. In the following description, an exemplary case in which, as described here, a user who does not have an in-house ID uses the image forming apparatus 110 will be described.

In the following description, instead of the word "in-house ID" used so far, the word "local ID" will be used. A local ID represents the aspect that the local ID is user identification information in an organization such as a company, which is a local environment. If a "local environment" is a company, a "local ID" means the same thing as an "in-house ID".

In this example, a temporary local ID is given to a user who does not have a local ID.

For example, in the case of a system in which an IC card type ID card storing local ID information is given to each user and user authentication for using the image forming apparatus 110 is performed using that IC card, an IC card is temporarily lent to a user who does not have an IC card. An IC card to be temporarily lent stores a predetermined local ID dedicated for temporary use. That is, a local ID included in an IC card to be temporarily lent has a value distinguished from a local ID (such as an employee number) formally given to an employee.

The user, who has been temporarily lent an IC card, performs user authentication on the image forming apparatus 110 by using that IC card, and uses a function such as printing or copying provided by the image forming apparatus 110. Here, in the case where the user wishes to perform printing using a cloud service, the image forming apparatus 110 includes the temporary local ID of the IC card in log information of that printing by using the method of the exemplary embodiment described using FIGS. 3 to 5.

In a certain example, an employee who has forgotten his/her IC card and a person (such as a visitor or a guest) who does not have an IC card in the first place are handled differently. For example, even in the case where an employee who has forgotten his/her IC card uses the image forming apparatus 110 with a temporary local ID, that employee's formal local ID will be apparent in the end. Thus, the formal local ID is recorded in association with log information recording the temporary local ID. Accordingly, who among the employees of the company has used the image forming apparatus 110 becomes apparent, and a destination to which the fee for using the image forming apparatus 110 is to be billed (hereinafter may also be referred to as a "to-be-billed destination") becomes specifiable, for example. In contrast, in the case of a person such as a visitor or a guest who does not have a formal local ID, log information is not associated with a formal local ID.

In the following description, a temporary local ID given to an employee who has forgotten his/her IC card will be referred to as a "temporary ID", and a temporary local ID given to a person (such as a visitor) who does not have an IC card will be referred to as a "guest ID".

If the range of values of temporary IDs and the range of values of guest IDs are arranged in advance, a device (such as the image forming apparatus 110) in the in-house network 100 is capable of distinguishing between a temporary ID and a guest ID from the value of an input local ID.

Figure 8:
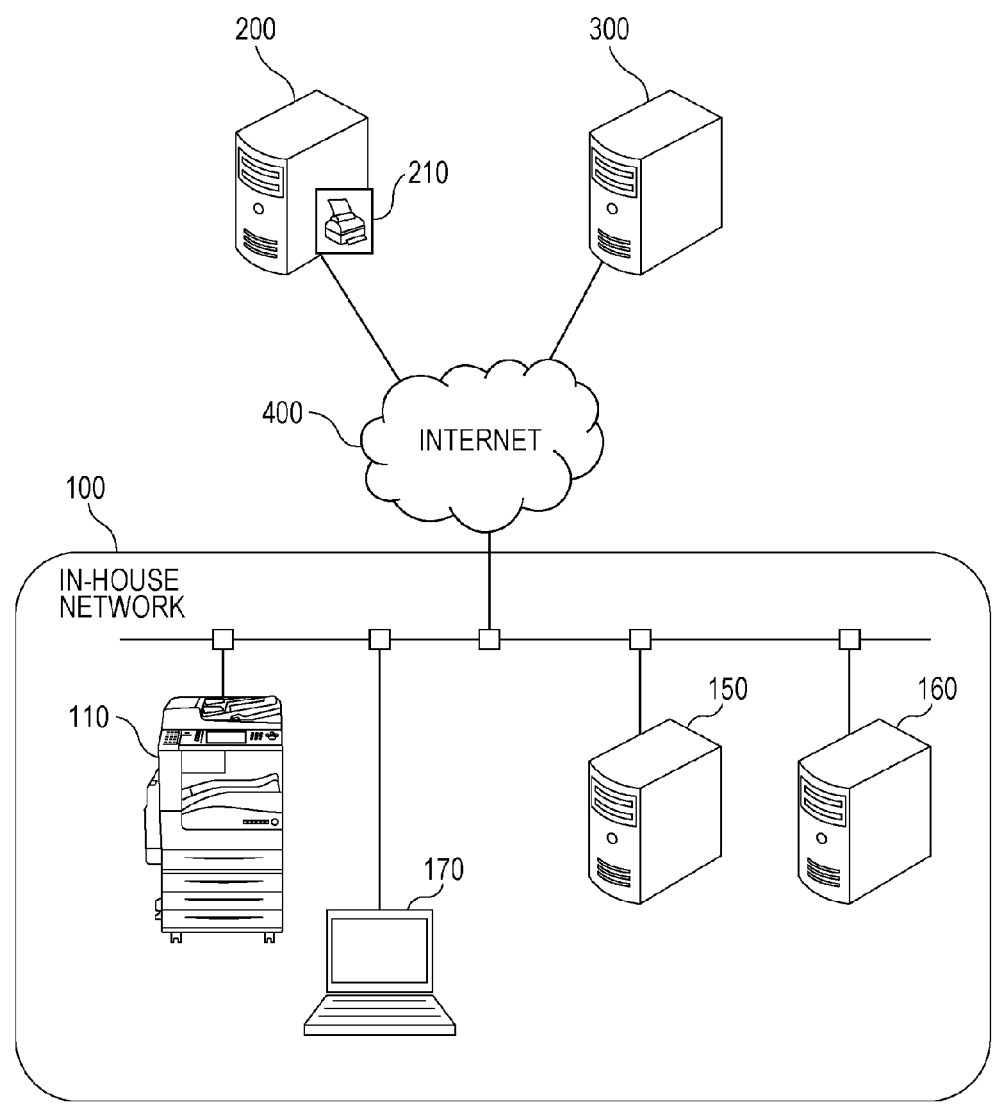
FIG. 8 is a diagram illustrating an example of a system using a temporary local ID (in-house ID)

FIG. 8 is a diagram illustrating an example of the configuration of a system in this example. In FIG. 8, elements that are the same as or similar to those illustrated in FIG. 1 are given the same reference numerals, and detailed descriptions thereof are omitted.

In the system example illustrated in FIG. 8, compared with the system example illustrated in FIG. 1, a management database (DB) 160 and a reception terminal 170 are added to the in-house network 100.

The management DB 160 is a database that manages management information of users and organizations in the in-house network 100. Various examples of the management information held by the management DB 160 will be given hereinafter. In the following description, it is described that these various types of management information are collectively managed by one management DB 160 in order to make the description concise. However, this is not essential. Alternatively, a discrete database configuration may be adopted in which various types of management information are configured as separate databases in separate computers.

The reception terminal 170 is a terminal for the work of issuing a temporary ID such as a temporary ID or a guest ID. For example, the reception terminal 170 is located at the reception of an organization such as a company.

An employee who has forgotten his/her IC card tells a receptionist at the reception that he/she has forgotten the IC card. After the employee has been checked that he/she is an employee, the employee receives a temporary IC card storing a temporary ID (a temporary IC card is temporarily lent). At this time, the receptionist operates the reception terminal 170 to register in the management DB 160 management information of the issued temporary ID. FIG. 9 illustrates an example of temporary ID management information recorded in the management DB 160.

In the example illustrated in FIG. 9, the information recorded in association with the temporary ID issued to the employee (which is stored in the IC card temporarily issued at the reception) includes the regular local ID of the employee (that is, the employee ID stored in the forgotten employee ID card) and the effective period of the temporary ID. Among these pieces of information, the temporary ID is simply read from the temporary IC card to be issued, for example. In addition, because who the employee is has been specified at the time of issuing the temporary IC card, the receptionist simply registers the employee's formal local ID in association with the temporary ID. The effective period is simply input by the receptionist in accordance with in-house rules, for example. In the example illustrated in FIG. 9, the temporary ID is arranged to take a value within the range from "fx50000" to "fx59999", which is only given here by way of example.

A visitor (guest) who is not an employee tells the receptionist at the reception his/her name, an organization (such as a company) to which he/she belongs, and the destination of his/her visit, and the guest is checked whether he/she is allowed to enter the company. After it has been confirmed by an employee or a division at the destination of the guest's visit that the guest is allowed to enter the company, the receptionist temporarily issues a guest IC card. In association with a local ID (guest ID) stored in the guest IC card, various types of information on the guest are registered in the management DB 160. FIG. 10 illustrates an example of guest ID management information recorded in the management DB 160.

In the example illustrated in FIG. 10, the effective period of the issued guest ID (stored in the IC card) and various types of information on the guest (the name of the guest, information indicating an organization to which the guest belongs, information on the destination of the visit, and a cloud ID in the illustrated example) are registered in association with the guest ID. In the example illustrated in FIG. 10, the guest ID is arranged to take a value within the range from "fx90000" to "fx99999", which is only given here by way of example.

As information on the destination of the visit, if the destination of the visit is an employee, the formal local ID of that employee ("fx10002" in the example illustrated in FIG. 10) is registered; if the destination of the visit is a division, a code specifying that division ("dv123" in the example illustrated in FIG. 10) is registered.

Alternatively, if the destination of the visit is a project, a code specifying that project ("pr345" in the example illustrated in FIG. 10) is registered in the information on the guest. Here, a "project" is a temporarily set user group, in contrast to a division that is permanently set as a premise. For example, a group is configured of employees from multiple divisions in order to develop a certain product. This group, which exists for the duration of the development, is an example of a project. Alternatively, it is possible to manage an event such as one held at a company or an academic conference as a project.

In the example illustrated in FIG. 10, a guest information management ID is provided to distinguish information on each guest (such as a set of a guest ID, effective period, and guest name). A guest ID (local ID issued to a guest) is an ID fixedly built into an IC card and is used for multiple guests, as in the case where the IC card is returned from one guest and then temporarily lent to the next guest. In contrast, a guest information management ID is unique to each visit, that is, unique to each set of a guest ID and its effective period. A guest information management ID is provided in order to easily associate log (processing history) information of the use of the image forming apparatus 110 and information on the guest and is not essential (because such association may be performed on the basis of information on the guest ID and the effective period).

In the case of a prescheduled guest, information on the name of the guest, an organization to which the guest belongs, the destination of the visit, and the like may be registered in the management DB 160 prior to the visit, and, upon the guest's visit, a guest ID held in a guest IC card temporarily lent to the guest may be registered in association with the pre-registered information in the management DB 160.

Next, an example of recording log information in the case where a user who is given a temporary ID or a guest ID uses the image forming apparatus 110 will be described.

FIG. 11A illustrates an example of log information generated by the image forming apparatus 110, and FIG. 11B illustrates an example of log information managed by the aggregation apparatus 150 which collects log information from each image forming apparatus 110.

In the example illustrated in FIG. 11A, the time and date on which the image forming apparatus 110 has performed processing, the type of the processing (types such as copying, printing, and facsimile sending), and the local ID of a user who has instructed the image forming apparatus 110 to perform that processing are recorded in log information generated by the image forming apparatus 110. Among these pieces of information, the local ID is simply read by a reading device connected to the image forming apparatus 110 from an IC card presented by the user for user authentication. If the IC card is one for temporary use, the read local ID is a temporary ID; if the IC card is one for a guest, the read local ID is a guest ID.

Even in the case where the user performs user authentication on the image forming apparatus 110 with a temporary ID or a guest ID and performs printing using the cloud, as has been described with reference to FIGS. 1 to 7, the value of the temporary ID or guest ID is set in a logical printer 210 in the cloud print service 200. The image forming apparatus 110 reads the temporary ID or guest ID from print setting information sent along with print data from the logical printer 210, and records the temporary ID or guest ID as the value of the local ID in the log information.

In addition, the log information generated by the image forming apparatus 110 may include, besides the above information, various types of information regarding the executed processing, such as parameters of the processing. For example, when copying or printing has been executed, information such as the number of output prints as a result thereof, the type of printing such as color printing or monochrome printing, and the like is recorded as items of log information. For example, in the case of facsimile sending or email sending, information on the sending destination (facsimile number or email address) and the like is recorded as items of log information.

In addition, in the case where printing using the cloud has been performed, the cloud ID of the user, which is used in logging into the cloud print service 200 upon printing, is recorded in the log information. In this case, for example, the cloud ID sent along with the print data from the cloud print service 200 may be recorded in the log information, or the cloud ID input by the user to the image forming apparatus 110 upon giving an instruction to perform printing using the cloud may be recorded in the log information.

In addition, the log information may further include an image log. An image log is data representing an image processed by the image forming apparatus 110. For example, in the case where copying has been performed, the image forming apparatus 110 records image data of a read document as an image log and records the image log as an item of the log information of the copying. Alternatively, in the case where print data in a page description language sent from a PC has been printed, the image forming apparatus 110 records image data generated by analyzing the print data, or the print data itself as an image log. Image data recorded as an image log may be the image data itself used in copying or printing, or data with a reduced amount of data generated by performing image compression or pixel skipping of the image data. In the example illustrated in FIGS. 11A and 11B, a Joint Photographic Experts Group (JPEG) image data generated by compressing an original image in the JPEG format is recorded as an image log in the case of copying (needles to say, this is only an example).

Because the image log is recorded in association with the local ID and the cloud ID in this example, for example, it is possible to track who has performed printing using the cloud and what kind of an image has been printed.

In the case where printing using the cloud described with reference to FIGS. 1 to 7 has been performed, print data (such as PDF data) sent from the cloud print service 200 may be recorded as an image log, or image data which is a processing target as in the case where local copying or printing is performed in response to an instruction from a PC in the in-house network 100 may be recorded as an image log.

In addition, in the case where printing using the cloud has been performed, the cloud ID used by the user may be recorded as an item of the log information (see FIGS. 11A and 11B). In the case of closed processing in the in-house network 100, the cloud ID is not recorded in the log information.

In the case of printing using the cloud, among the items of log information illustrated by way of example in FIGS. 11A and 11B, items other than the image log and the ID user may be obtained from information included in a print ticket sent to the image forming apparatus 110 along with print data from the cloud print service 200. Therefore, in the case of printing using the cloud, the image forming apparatus 110 may record a pair of print data (such as PDF data) and a print ticket as log information. In this case, print data corresponds to an image log, and a print ticket corresponds to another log item.

By applying a digital signature based on a digital certificate of the image forming apparatus 110 itself (that is, an electronic signature based on a secret key corresponding to the digital certificate) to an image log recorded by the image forming apparatus 110, even if someone tampers with the image log saved in the image forming apparatus 110, aggregation apparatus 150, or the like, the tampering becomes detectable.

In addition, a digital signature based on a digital certificate of the cloud print service 200 may be applied to print data or a print ticket sent from the cloud print service 200 to the image forming apparatus 110, and the signature may be verified by the image forming apparatus 110. With this verification, if someone tampers with the print data or the like on the way, the tampering is detectable, and, in response to this detection, error processing such as stopping the printing may be performed. In addition, a digital certificate of a reliable cloud print service 200 may be registered in advance in the image forming apparatus 110, and, among items of signed print data or the like coming from the outside, print data that is unverifiable with the registered digital certificate may not be printed by the image forming apparatus 110.

After user authentication with an IC card, each image forming apparatus 110 in the in-house network 100 generates the above-described log information every time the image forming apparatus 110 performs processing in response to an instruction given by the user, and saves the log information in a built-in memory.

In a first example, log information recorded by each image forming apparatus 110 is collected by the aggregation apparatus 150 at a predetermined frequency such as once a day or in a preset non-busy period (such as at night or during a lunch break). If the capacity of a communication line between each image forming apparatus 110 and the aggregation apparatus 150 is sufficiently large (that is, the communication line is sufficiently fast), log information generated by the image forming apparatus 110 may be instantly registered in the management DB 160; if the capacity of the communication line is limited, the log information may be collected in a non-busy period in order to suppress effects on a normal communication traffic.

In the examples illustrated in FIGS. 11A and 11B, in log information managed by the aggregation apparatus 150, which is illustrated in FIG. 11B, the item "ID user" is added to log information generated by the image forming apparatus 110, which is illustrated in FIG. 11A. The "ID user" is information that specifies a user who has used the image forming apparatus 110 using an IC card with a temporary ID or a guest ID. Therefore, the information "ID user" is not included in log information generated in the case where an employee uses the image forming apparatus 110 after performing user authentication with his/her regular local ID (employee ID) because the local ID recorded in the log information is the "ID user" himself/herself.

In the case of processing using a temporary ID, the regular local ID of a user who has given an instruction for this processing is registered in the "ID user" column. Alternatively, in the case of processing using a guest ID, information that specifies who a user (guest) who has given an instruction for this processing is, that is, a guest information management ID that specifies information on the guest registered in the management DB 160 in the example illustrated in FIG. 11B, is registered. Instead of the guest information management ID, guest information itself (such as the name, an organization to which the guest belongs, etc.; see FIG. 10) may be recorded as the "ID user" information.

The value of the "ID user" in the log information may be specified by collating, for example, a combination of a local ID (temporary ID or guest ID) and the processing time and date included in the log information with a combination of a temporary ID or a guest ID recorded in the guest ID management information (see FIG. 9) and the ID's effective period. For example, in the example illustrated in FIGS. 11A and 11B, in the case of printing performed by a user with the local ID (guest ID) "fx90001" at 10:27:03 on Apr. 1, 2013, a combination of the guest ID and the time and date matches a combination of the guest ID and the effective period of the guest information management ID "gt123456" in FIG. 10. Thus, the guest information management ID "gt123456" is recorded in the "ID user" line.

Although omitted in the drawings, information that specifies the to-be-billed destination of processing performed by the image forming apparatus 110 may be recorded in the log information.

In the example illustrated in FIG. 11A, the "ID user" information is not included in the log information recorded by the image forming apparatus 110; this is because of the following reason. That is, in order to specify the "ID user", it is necessary for the image forming apparatus 110 to access the management DB 160 and refer to management information of a temporary ID or a guest ID. If the capacity of a communication line between the image forming apparatus 110 and the management DB 160 is small (low speed), it takes much time to refer to the information, or part of the computing power of the image forming apparatus 110 is used to refer to the information. For these reasons, it takes time from when a user gives a processing instruction to the image forming apparatus 110 to when the image forming apparatus 110 actually starts the processing. In the example illustrated in FIG. 11A, in order to prevent such a delay in the start of processing, the image forming apparatus 110 does not specify the "ID user", but the aggregation apparatus 150 specifies the "ID user".

Alternatively, in the case where, for example, the capacity of a communication line between the image forming apparatus 110 and the management DB 160 is sufficiently large, if a delay in the start of processing for which an instruction has been given from a user is unlikely to be caused even when the image forming apparatus 110 specifies the "ID user", the image forming apparatus 110 may record the "ID user" as part of the log information.

A temporary or guest IC card that has been temporarily issued to an employee or guest is returned to the reception when the employee or guest exits the company. The returned temporary or guest IC card will be temporarily issued to another employee or guest at a later time.

This method of re-using a temporary or guest IC card (and a local ID included therein) is only exemplary. Instead of this method, a temporary ID card on which a completely unique temporary ID or guest ID is printed as a code image such as a barcode may be issued to a user. In this case, a reading device connected to the image forming apparatus 110 simply recognizes the code image printed on the ID card presented by the user, and obtains the user's local ID (temporary ID or guest ID).

As has been described so far, even in the case where a temporary local ID such as a temporary ID or a guest ID is used, as with the example illustrated in FIGS. 1 to 7, printing using the cloud may be performed, and the temporary ID or guest ID of the user who has given a printing instruction may be recorded in log information of that printing. In addition, detailed information on an employee or guest corresponding to the recorded temporary ID or guest ID may be specified, and the specified information may be associated with the log information.

In the above example, association between a temporary ID and a regular local ID is performed on the basis of the corresponding relationship between a temporary ID and a local ID included in the management information (see FIG. 9) held in the management DB 160 or the like. Instead of this example, information on the corresponding relationship between a regular local ID and a cloud ID of each user may be retained in the management DB 160, and, for log information of printing using the cloud or the like, a local ID corresponding to a cloud ID included in the log information may be specified from the corresponding relationship between the local ID and the cloud ID.

Billing Processing

Next, an example of billing processing in this system will be described.

In this example, besides the method of billing the local ID of a user who has given an instruction to execute processing, the method of changing the a destination to which the fee for the processing is to be billed to a to-be-billed destination specified by the user is also provided. As an example of the latter method, for example, there is a case in which the to-be-billed destination of processing performed by an employee using the image forming apparatus 110 is changed to the budget of a division (department) or project in the company to which the user belongs. As another example of changing the to-be-billed destination, for example, there is a case in which the fee for processing performed by an employee using a temporary ID is billed to the employee's regular (formal) local ID, or a case in which the fee for processing performed by a guest using a guest ID is billed to an in-house division that has invited that guest.

To change the to-be-billed destination as in the above cases, management information of users (employees), divisions, and projects illustrated in FIGS. 12 to 14 is registered in, for example, the management DB 160 in the in-house network 100.

In the user management information illustrated in FIG. 12, in association with the local ID (regular one) of each employee, a division code indicating a division to which the employee belongs and a project code indicating a project to which the employee currently belongs are registered. In the case where one employee is simultaneously participating in multiple projects, codes of the projects in which the employee participates are registered in the user management information. In the example illustrated in FIG. 12, the employee "fx10001" participates in two projects "pr012" and "pr123". If it is assumed that an employee will be notified of processing performed by the image forming apparatus 110, the employee's contact information (such as an email address or the address of an instant message service) may be registered as an item of the user management information.

In the division management information illustrated in FIG. 13, in association with a division ID (may also be referred to as a "division code") that uniquely identifies each division in a company (organization), that division's name and contact information (such as an email address, the address of an instant message service, or a telephone number) of a representative who is in charge of that division are registered.

In the project management information illustrated in FIG. 14, in association with a project ID (may also be referred to as a "project code") that uniquely identifies each project that has been temporarily organized, that project's name and contact information (such as an email address, the address of an instant message service, or a telephone number) of a representative who is in charge of that project are registered.

In the case where an employee performs user authentication on the image forming apparatus 110 by using his/her regular local ID, the image forming apparatus 110 causes the user to specify the to-be-billed destination of processing performed by the user. In one example, information on a division and a project(s) to which the user belongs corresponding to the local ID is read from the management DB 160, and, on the basis of the read result, a user interface (UI) screen is generated on which the employee and the division and project(s) to which the employee belongs are given as candidates for a to-be-billed destination. From the UI screen, the user selects a to-be-billed destination of this processing. Upon selecting a to-be-billed destination, the user may be asked to enter a password corresponding to a division or project to which the user belongs, and, if the entered password is correct, the user may be able to select that division or project as a to-be-billed destination.

Instead of presenting to the user candidates for a to-be-billed destination and having the user select one from among the candidates, a to-be-billed destination may be specified by having the user directly input the code (ID) of a division or project serving as a to-be-billed destination by using a keypad or the like of the image forming apparatus 110. In this case, the user management information may not include information on a division or project(s) to which each user belongs. Also in this case, to check that the user has a legitimate right to a division or project input by the user as a to-be-billed destination, the user may be asked to enter authentication information such as a password corresponding to the division or project.

In addition, a division code or project code serving as the to-be-billed destination of processing performed using the image forming apparatus 110 may be set in the image forming apparatus 110. One example is the case in which the code of a division or project serving as a to-be-billed destination is set in the image forming apparatus 110 located in the division or the image forming apparatus 110 set to be dedicated for the project.

In the case of printing using the cloud, information on a to-be-billed destination specified by a user or set in the image forming apparatus 110 in the foregoing manner may be set in a logical printer 210 of the cloud print service 200 as a uniquely defined element, as with the above-described method of recording a local ID. That is, by giving an instruction to generate a logical printer 210 or to update the setting in an existing logical printer 210 using a print ticket or setting information (such as PrintCapability) representing the capability of the image forming apparatus 110, the logical printer 210 in which information on the to-be-billed destination is set is provided in the cloud print service 200.

In this case, a print ticket sent from the logical printer 210 to the image forming apparatus 110 along with print data includes, as illustrated in FIG. 15, a local ID and a to-be-billed destination code that are uniquely defined elements set in the logical printer 210. In the example illustrated in FIG. 15, the print ticket includes, as uniquely defined elements, the local ID "fx23456" of a user who has given a print instruction and the code "pr456" of a project serving as a to-be-billed destination selected by the user. In the case where the local ID of a user who has given a print instruction is selected as a to-be-billed destination, the to-be-billed destination code element may be omitted from the setting information in the logical printer 210 or the print ticket.

The image forming apparatus 110, which has received the print ticket along with the print data, records the local ID and to-be-billed destination code extracted from the print ticket as items of log information regarding printing of the print data (see FIG. 17). The recorded to-be-billed destination code is used in aggregation of fees at the aggregation apparatus 150. That is, in aggregation of fees by the aggregation apparatus 150, the amount of fee for processing corresponding to each piece of log information is added to, for example, the value of a total fee corresponding to a to-be-billed destination code included in that piece of log information.

In this case, as with the case described with reference to FIGS. 1 to 7, the used logical printer 210 may be deleted upon completion of printing or the like, or the local ID of the user may be deleted from the logical printer 210.

In another example, a logical printer 210 may be generated in the cloud print service 200 for each to-be-billed destination (each employee, each division, and each project), and the image forming apparatus 110 may give a print instruction to a logical printer 210 corresponding to a to-be-billed destination specified by the user. In a logical printer 210 for each to-be-billed destination, a to-be-billed destination code (local ID, division code, etc.) that specifies the to-be-billed destination is set as a uniquely defined element. A logical printer 210 provides the image forming apparatus 110 with print data along with a print ticket including the to-be-billed destination code of the logical printer 210, and the image forming apparatus 110 records the to-be-billed destination code in the print ticket in log information. In this case, information of the local ID of a user who has given the print instruction is set in a logical printer 210 corresponding to the selected to-be-billed destination. The information of the local ID is incorporated in a print ticket, and the print ticket is provided to the image forming apparatus 110 along with print data. The information of the local ID may be deleted upon finishing of the printing, as with the case described with reference to FIGS. 1 to 7.

The foregoing example is the case in which an employee performs printing using his/her regular local ID. Meanwhile, in the case where a temporary IC card (temporary ID) is issued to an employee who has forgotten his/her regular IC card and the employee uses the image forming apparatus 110 using the temporary ID, the fee for the use of the image forming apparatus 110 is billed to the employee's regular local ID, for example. That is, in the case where a local ID included in log information collected from the image forming apparatus 110 is a temporary ID, the aggregation apparatus 150 obtains a regular local ID corresponding to the temporary ID from temporary ID management information (see FIG. 9), and adds the amount of fee for processing corresponding to the log information to the total amount of fee billed to the regular ID.

In another example, a user who has performed user authentication on the image forming apparatus 110 using a temporary ID may be asked to enter a division code or a project code serving as a to-be-billed destination, and the entered code of the to-be-billed destination may be recorded in log information. In this case, in the case of printing using the cloud, as with the above-described example of using a regular local ID, the entered code of the to-be-billed destination is set in a logical printer 210, and the image forming apparatus 110 records, in log information, the to-be-billed destination code included in a print ticket sent along with print data from the logical printer 210.

Further, the following method may be used. That is, in this method, the image forming apparatus 110 sends a temporary ID presented by a user in user authentication to the management DB 160. In response to this, the management DB 160 specifies a regular local ID corresponding to the temporary ID, specifies a division and each project, to which the user belongs, corresponding to the specified regular ID, and provides the image forming apparatus 110 with a list including the specified division and project(s). The image forming apparatus 110 causes the user to select a to-be-billed destination from the list, sets the selected to-be-billed destination in a logical printer 210, and performs printing using the logical printer 210. In response to this, the logical printer 210 provides the image forming apparatus 110 with print data and a print ticket including the code of the to-be-billed destination, and the image forming apparatus 110 records the to-be-billed destination code extracted from the print ticket in log information of printing of the print data.

For each guest, a billing method to be applied to the guest is registered in the management DB 160, and billing processing in accordance with the billing method is performed. A billing method to be applied to each guest includes cash, payment by emoney, payment by debit card or credit card, payment corresponding to the cloud account of the guest, and changing the to-be-billed destination to an in-house division or project the guest has visited.

Here, an example of payment corresponding to a cloud account (cloud ID) includes, for example, Google Wallet (registered trademark) corresponding to the Google account of a user who has performed printing using Google Cloud Print as the cloud print service 200.

In the case of printing using the cloud print service 200, a user enters his/her cloud ID for giving a print instruction. Thus, a payment system in the in-house network 100 simply accesses the cloud service, bills the amount of fee for the printing to an account corresponding to the cloud ID, and settles the payment.

The fee for processing not using the cloud print service 200 (such as copying of a paper document) may be settled with the cloud account of a guest. In this case, at the time a guest ID is issued at the reception terminal 170 to a guest or a guest gives an instruction to the image forming apparatus 110 to perform processing, the guest is asked to enter his/her cloud ID, and the fee for a cloud service may be settled using the cloud ID in billing processing.

FIG. 16 illustrates an example of guest management information including information on a billing method, which is held in the management DB 160. In this example, information representing a billing method to be applied to each guest is registered in correspondence with the guest ID, besides items (omitted in FIG. 16) illustrated by way of example in FIG. 10. In the case where payment by cash, emoney, debit card, credit card, or the like is used, for example, identification information that identifies the type of billing method is registered in information on the billing method. In the case of cloud account settlement, identification information indicating a cloud account settlement method is registered in the billing method column. In the case where a guest is allowed for cloud account settlement for the functions of the image forming apparatus 110 other than printing using the cloud, the cloud ID of the guest is further registered. In addition, in the case of the method of changing the to-be-billed destination to an employee, division, project, or the like, a local ID or code that specifies an employee, division, or project serving as a new to-be-billed destination after the change is registered along with identification information indicating the method. For example, in the case where an employee, division, or project that invites a guest accepts a fee billed to the guest, the to-be-billed destination code (local ID or the code of a division or project) of the employee, division, or project is simply registered in advance as a to-be-billed destination in management information on the guest in the management DB 160. In the example illustrated in FIG. 16, as a billing method corresponding to the guest management information ID "gt125678", changing of the to-be-billed destination to the account of the project "pr1234" is specified.

In the case where payment by cash, emoney, debit card, or credit card is selected as a guest's billing method, for example, at the time the guest returns a guest IC card upon exiting, the receptionist simply settles the amount of fee with the guest by using the selected method. In the case where payment by cash is selected, the receptionist simply accepts payment by cash from the guest. In the case of payment by credit card, credit settlement is simply done at the reception. In the settlement, the reception terminal 170 accesses the aggregation apparatus 150, receives information on the amount of fee corresponding to the guest ID of the guest, and asks the guest to pay the amount of fee (here, it is assumed that, for each guest ID, the aggregation apparatus 150 collects the amount of fee in each piece of log information including the guest ID). Among items of log information of processing performed with each guest ID, each image forming apparatus 110 sends at least information necessary for determining the amount of fee to the aggregation apparatus 150 immediately after execution of processing, without waiting for the timing to collect log information from the aggregation apparatus 150. Accordingly, settlement may be done at the reception at the time a guest exists.

Note that the amount of fee is simply calculated on the basis of a unit price according to each type of processing for which a guest has given an instruction and the amount of processing (the number of outputs). The type of processing is, for example, a combination of distinction between monochrome output and color output, distinction among copying, printing, and facsimile sending, and whether to use the cloud.

In the case where it has been specified to perform cloud account settlement or to change the to-be-billed destination to an in-house to-be-billed destination, settlement processing at the reception is unnecessary, and the amount of fee billed to the guest is simply added to the cloud account or the code of the specified in-house to-be-billed destination.

In determination of a to-be-billed destination regarding each piece of log information of each guest, for example, the aggregation apparatus 150, which has received log information from the image forming apparatus 110, refers to the management DB 160 to specify a billing method, determines a to-be-billed destination in accordance with the billing method, and records the to-be-billed destination in log information. In another example, the image forming apparatus 110 may refer to the management DB 160 to determine a billing method (and further a to-be-billed destination if necessary). In this case, information on the determined billing method (and further the to-be-billed destination if necessary) is set as a uniquely defined element in a logical printer 210 in the cloud print service 200. Accordingly, the image forming apparatus 110 is able to obtain a to-be-billed destination for print data coming from the logical printer 210, from a print ticket that accompanies the print data, in the same or similar method as the case of a local ID.

FIG. 17 illustrates an example of data content of log information recorded by the aggregation apparatus 150 in this example. In this example, in addition to the items illustrated by way of example in FIG. 11B, "to-be-billed destination" information is recorded. In the case where an employee, division, or project is a to-be-billed destination (or a new to-be-billed destination after the change), the local ID of the employee, the division code of the division, or the project code of the project is recorded in the to-be-billed destination. In the case where a guest or the like personally settles the fee as in credit card settlement, this billing method is recorded as information on the to-be-billed destination. Although omitted in the drawing, the aggregation apparatus 150 collects, from these pieces of log information, the total amount of fee billed to each local ID, each division code, each project code, and each guest information management ID. The result of collecting the total amount of fee of a guest is referred to upon settlement of the fee billed to the guest at the reception or the like. The fee billed to a local ID or division ID is settled in-house as has been done previously.

In the above example, the code of a to-be-billed destination specified by a user is set in a logical printer 210, the to-be-billed destination code is detected from a print ticket that comes from the logical printer 210 to the image forming apparatus 110 along with print data, and the to-be-billed destination code is recorded in a log. However, this is only exemplary. Instead of this, for example, the image forming apparatus 110 may store a to-be-billed destination code specified by a user at the time the user gives a print instruction, and, upon printing of print data corresponding to the print instruction, the stored to-be-billed destination code may be recorded in log information.

Other Processing Using Cloud

So far, the case in which printing is performed with the image forming apparatus 110 using the cloud print service 200 has been described by way of example. However, there are various types of processing performed by the image forming apparatus 110 using print data (in the PDF format or the like) from the cloud print service 200, besides directly printing the print data. Hereinafter, some examples will be described.

(a) Security Printing

One example is security printing. Security printing is generally a method used to prevent, in response to a print instruction given by a user from a PC or the like to the image forming apparatus 110, a printed sheet from being exposed to other people before the user comes to a place where the image forming apparatus 110 is located and obtains the printed sheet output to an output tray of the image forming apparatus 110. In security printing, the image forming apparatus 110 does not promptly print print data received from a PC or the like or output the printed result to the output tray; the image forming apparatus 110 saves the print data (or image data for printing, generated from the print data) in a storage area secured in a corresponding memory in association with a local ID. When the user comes to the image forming apparatus 110 and is authenticated using a local ID by using an IC card or the like, printing and outputting of the print data held in a storage area corresponding to the user is performed.

Such security printing is realized in the exemplary embodiment as follows. A user inputs, from the user's terminal such as a PC or smart phone, specification of print data to be printed, various types of print setting such as the number of prints, specification of the image forming apparatus 110 at an output destination, the user's local ID, and specification to perform security printing, and gives a print instruction including these pieces of information to the cloud print service 200. Information of this print instruction is simply generated by the terminal in the form of, for example, a print ticket, and sent to the cloud print service 200. Among these pieces of information, the local ID and specification to perform security printing are simply included as, for example, uniquely defined elements in the print ticket, and sent to the cloud print service 200. As with the example illustrated in FIGS. 1 to 7, the cloud print service 200 generates a logical printer 210 in which the local ID and specification to perform security printing are set as uniquely defined elements, or sets the values of these uniquely defined elements in setting information in an existing logical printer 210. These pieces of setting information including the local ID are included in a print ticket that comes from the logical printer 210 to the image forming apparatus 110 along with print data. Upon reading information that specifies a security printing function from the print ticket, the image forming apparatus 110 saves the print data in a storage area corresponding to the local ID included in the print ticket. When a user with the local ID gives an instruction to perform user authentication on the image forming apparatus 110 and when it is determined that the authentication is appropriate, the image forming apparatus 110 prints and outputs the print data in the storage area corresponding to the local ID.

In addition, there is a method in which a storage area is shared by multiple people, and, in response to inputting, by a user to the image forming apparatus 110, authentication information corresponding to the storage area (such as a password set for the storage area), print data saved in the storage area is printed and output. In the case where security printing in such a method is realized by using the cloud, it is simply necessary for print instruction information such as a print ticket sent from a terminal to the cloud print service 200 to include, as uniquely defined information, information that identifies a storage area of print data that specifies the storage area. In this case, when a user performs user authentication on the image forming apparatus 110 and enters authentication information corresponding to the storage area, print data saved in the storage area is printed and output. In this case, a local ID specified by the user authentication is recorded in log information. In addition, "security printing" may be recorded as the type of processing in the log information.

In addition, there is a known function in which, a job flow, described later, is associated with a security box, and, in response to inputting of print data to the security box, the associated job flow is executed. This function may be applied to print data input from the cloud print service 200.

In this example, in the case where a print ticket transferred along with print data from the cloud print service 200 to the image forming apparatus 110 includes information that specifies a storage area of the print data, the print data is input to the storage area. In the case where the storage area is associated with a job flow describing a series of processes, the image forming apparatus 110 executes the series of processes described in the job flow on the print data saved in the storage area. The series of processes on the print data may be processing performed by the image forming apparatus 110, such as image processing or format conversion processing, or may be processing such as transfer processing to another apparatus or processing performed by this other apparatus.

(b) Facsimile Sending and Email Sending

A user's document data in the cloud may be sent via facsimile from the image forming apparatus 110 via the cloud print service 200. To perform facsimile sending using the cloud, after user authentication, the user inputs information that specifies document data to be sent, the facsimile number of a destination, and the like to the image forming apparatus 110. In response to this input, the image forming apparatus 110 sends a print ticket including the user's local ID and the facsimile number of the destination as uniquely defined information to the cloud print service 200, and prepares a logical printer 210 in which the local ID and the facsimile number of the destination are set in the cloud print service 200. In addition, the image forming apparatus 110 gives an instruction to the cloud repository service 300 to send the document data to the logical printer 210. The logical printer 210 converts the document data into print data in the PDF format or the like, and sends the print data along with a print ticket including the local ID and the facsimile number of the destination, set in the logical printer 210, to the image forming apparatus 110. In the case where the print ticket, received along with the print data, includes the facsimile number of the destination, the image forming apparatus 110 sends the print data (or image data generated by analyzing the print data) via facsimile to the facsimile number of the destination.

Using the same or similar method, the image forming apparatus 110 may send document data in the cloud to the email address of a destination, specified by a user.

In the case where a facsimile is sent or an email is sent as above, destination information is recorded in log information.

(c) Job Flow Processing

There is known technology for performing a series of coordinated services (referred to as a "job flow") on data by coordinating one or more processing functions on various types of data provided by the image forming apparatus 110, a server in the in-house network 100, or a server on the Internet 400. A job flow realizes one coordinated service on data by performing processing while transferring, among processing functions, services, or apparatuses, print data or the result of processing in accordance with flow definition data (hereinafter referred to as "instruction data") which is data describing a series of processes. Data includes description of the execution order of a series of processes configuring a job flow, information that specifies an apparatus or application that execute each process (such as the IP address of an apparatus or a server or information that identifies a processing application), and information on the content of a process executed by the apparatus or the like (the type of process, a parameter used in the process, etc.). Schematically, processing result data in an apparatus or the like defined as an apparatus or the like that performs each process in a job flow is transferred to the next apparatus in a procedure defined in the job flow, and this next apparatus or the like further performs processing on the processing result data in accordance with information on the content of the process performed by the next apparatus or the like in the procedure described in the instruction data.

For example, an exemplary job flow is the flow of a series of processes on data, including (a) printing input print data, (b) extracting text data from the print data, and (c) sending an email including the text data as attached data to a specified email address. In this case, the processes (a) and (c) are executed by, for example, the image forming apparatus 110, and the process (b) is executed by, for example, an in-house server. In this example, the image forming apparatus 110 prints print data received along with instruction data in which the job flow is defined, and transfers the print data along with the instruction data to a server that performs text data extraction processing, which is the process (b). The server executes processing to extract text data from the print data in accordance with an instruction indicated in the instruction data, and transfers the extracted text data along with the instruction data to the image forming apparatus 110. The image forming apparatus 110 generates an email including the text data, and sends the email to a destination email address indicated in the instruction data.

Such a job flow is specifiable as the output destination of print data provided from the cloud print service 200 to the image forming apparatus 110.

In one example, upon receipt of an instruction given from a user to execute job flow processing on a document in the cloud, the image forming apparatus 110 sets, in a logical printer 210 in the cloud print service 200, information that specifies the job flow given in the instruction (such as a flow ID that is identification information that specifies the job flow). This setting is simply performed, as with the case of setting the local ID of a user in a logical printer 210, by giving an instruction to generate a logical printer 210 or to update setting in an existing logical printer 210 using a print ticket or setting information (such as PrintCapability) representing the capability of the image forming apparatus 110. In one example, using a print ticket including the local ID of a user who has given an instruction to perform processing and a flow ID as uniquely defined elements, the local ID and the flow ID are collectively set in the logical printer 210 (or such a logical printer 210 is generated). In the case where a to-be-billed destination is specified, the to-be-billed destination code may be included in the print ticket, and the to-be-billed destination code may also be set in the logical printer 210.

For example, in the case where a job flow is also presented as a processing choice besides printing, copying, and facsimile sending on the UI unit 112 of the image forming apparatus 110 and a user selects the job flow from among these choices, the user is prompted to further select one from among multiple job flows prepared in advance. The flow ID of the job flow selected by the user is included in a print ticket, and the print ticket is sent to the cloud print service 200, thereby setting the flow ID of the job flow in a logical printer 210.

Pieces of definition information (instruction data) of multiple job flows serving as choices are held in association with flow IDs in, for example, the image forming apparatus 110. In another example, these pieces of instruction data are held in a server (referred to as a "flow server") located in the in-house network 100 or the Internet 400, and the image forming apparatus 110 obtains instruction data corresponding to a flow ID specified by a user from the flow server or requests the flow server to execute the instruction data corresponding to the flow ID.

The foregoing examples describe the method of providing, every time specification of a job flow to be executed is received from a user, a logical printer 210 in which the flow ID of the job flow is set in the cloud print service 200.

In contrast, as another method, a logical printer 210 in which, for each job flow, the flow ID of the job flow is set as a uniquely defined element may be prepared in the cloud print service 200. In this case, the image forming apparatus 110 is capable of accessing information on the corresponding relationship between a flow ID and a logical printer 210. The image forming apparatus 110 specifies, on the basis of the information, a logical printer 210 corresponding to a flow ID selected by a user as an execution target, and gives an instruction to the specified logical printer 210 to process document data specified separately by the user as a processing target.

In any of the above methods, a logical printer 210 in which a flow ID representing a job flow for which a user has given an instruction exists in the cloud print service 200, and the logical printer 210 is specified as a device in charge of processing to-be-processed document data. The image forming apparatus 110 gives an instruction to the logical printer 210 to output, for example, document data in the cloud repository service 300. This output instruction may be a print instruction corresponding to the logical printer 210 (that is, in realization of the job flow, it is unnecessary to alter a program in the logical printer 210). The logical printer 210, which has received the instruction, processes the document data to generate print data (in the PDF format, for example), and sends the print data along with a print ticket that includes the set flow ID as a uniquely defined element to the image forming apparatus 110.

The image forming apparatus 110, which has received the print data and the print ticket, detects the flow ID from the print ticket, and recognizes that processing to be performed on the print data is not printing but a job flow corresponding to the flow ID. In this case, the image forming apparatus 110 specifies, from among pieces of instruction data held therein, instruction data corresponding to the flow ID, and executes processing described in the instruction data. Accordingly, processing realized by coordination between one or more processing apparatuses (the image forming apparatus 110, a server, and the like) described in the instruction data is applied to the print data. Having executed the job flow, the image forming apparatus 110 records the flow ID of the job flow in log information.

In the case where, in the image forming apparatus 110, there is no instruction data corresponding to the flow ID included in the print ticket, the image forming apparatus 110 accesses the flow server (the image forming apparatus 110 knows how to access the flow server) and obtains instruction data corresponding to the flow ID from the flow server or gives an instruction to the flow server to execute instruction data corresponding to the flow ID. Even in the case where the flow server executes the instruction data, each processing apparatus described in the instruction data is caused to execute corresponding processing. Thus, the content of executed processing remains unchanged.

In the foregoing example, the ID of a job flow for which a user has given an instruction is set in a logical printer 210, and a print ticket including the flow ID along with print data from the logical printer 210 is provided to the image forming apparatus 110. However, this is only exemplary. In principle, it is only necessary that the content of a job flow for which a user has given an instruction be specifiable from a print ticket coming along with print data from the logical printer 210. In an extreme example, the instruction data of a job flow itself may be set as a uniquely defined element in the logical printer 210, and a print ticket including the instruction data may be caused to arrive at the image forming apparatus 110.

(d) Outputting from Another Printer

For example, in the case where the image forming apparatus 110 is a multifunctional apparatus for office use, the image forming apparatus 110 is incapable of printing on a plastic card. However, such special printing unexecutable by the image forming apparatus 110 may be executed using the cloud print service 200. For example, a printer in the in-house network 100 that is capable of printing on a plastic card is not provided with a UI function for giving an instruction to perform processing using the cloud print service 200, and an instruction is given to the cloud using the UI function of the image forming apparatus 110.

In this case, a user inputs information that specifies a printer at an output destination (such as an IP address), an output parameter to be transferred to the output destination (such as information that specifies a medium at the output destination), and the like to the image forming apparatus 110. The image forming apparatus 110 sets these pieces of information as uniquely defined elements in a logical printer 210 by using the same or similar method as setting a local ID. The image forming apparatus 110 specifies document data to be printed and gives an instruction to the logical printer 210 to print the document data.

In response to this, the logical printer 210 generates print data by processing the document data, and sends the print data along with a print ticket including the information which specifies the printer at the output destination, the output parameter, and the like as uniquely defined elements to the image forming apparatus 110. The image forming apparatus 110, which has received the print data and the print ticket, transfers the print data to the printer to print the print data when the image forming apparatus 110 has detected the information on the printer at the output destination from the print ticket. In transfer of the print data, the output parameter included in the print ticket is additionally transferred, and hence printing in accordance with the output printer may be performed.

(e) Conclusion

As has been described above, various functions executable by the image forming apparatus 110 on print data sent from an apparatus in the in-house network 100 or image data read with the scan function of the image forming apparatus 110 are also executable on print data sent from the cloud print service 200 to the image forming apparatus 110.

In the foregoing examples, in order to realize these various functions, information that specifies these functions (such as specification of security, the facsimile number of a destination, and job flow information) is set in a logical printer 210. However, this is only exemplary. Instead of this, for example, the image forming apparatus 110 may store information that specifies a function specified by a user in a processing instruction and, upon receipt of print data corresponding to the processing instruction, execute a function specified by the stored information (such as security printing or a job flow).

Output Restriction

An output restriction, based on user authority, on output processing from the image forming apparatus 110 using the cloud print service 200 will be described.

For processing such as printing or copying closed in the in-house network 100, control has hitherto been performed in which the use authority of each individual user is determined and use is permitted within the authority. Hereinafter, an example in which such use authority control for each individual is applied to processing using the cloud print service 200 will be described.

In this example, each user's use authority information for the image forming apparatus 110 in the in-house network 100 is registered in the management DB 160 (see FIG. 8). FIG. 18 illustrates an example of use authority information.

In the example illustrated in FIG. 18, information on each user's various types of authority is indicated in association with the user's local ID. In the illustrated example, the use authority information includes information indicating whether the user has authority to use color printing and double-sided printing, the maximum number of output prints permitted to the user at present, and whether the user has authority to use each of the basic functions including printing, copying, facsimile sending, and scanning. The value of the maximum number of output prints is updated every time the user executes processing, such as printing, using the image forming apparatus 110, for example. In another example, the maximum number of output prints is updated in accordance with the result of aggregation every time the aggregation apparatus 150 aggregates log information of processing executed by the image forming apparatus 110. That is, for example, the sum of output prints in processing executed after the last aggregation timing is subtracted from the maximum number of output prints.

In addition, in the example illustrated in FIG. 18, the use authority information includes information on various types of use authority for each temporary ID (in this example, the temporary ID may take a value within the range from "fx50000" to "fx59999") and each guest ID (in this example, the guest ID may take a value within the range from "fx90000" to "fx99999").

Figure 19:
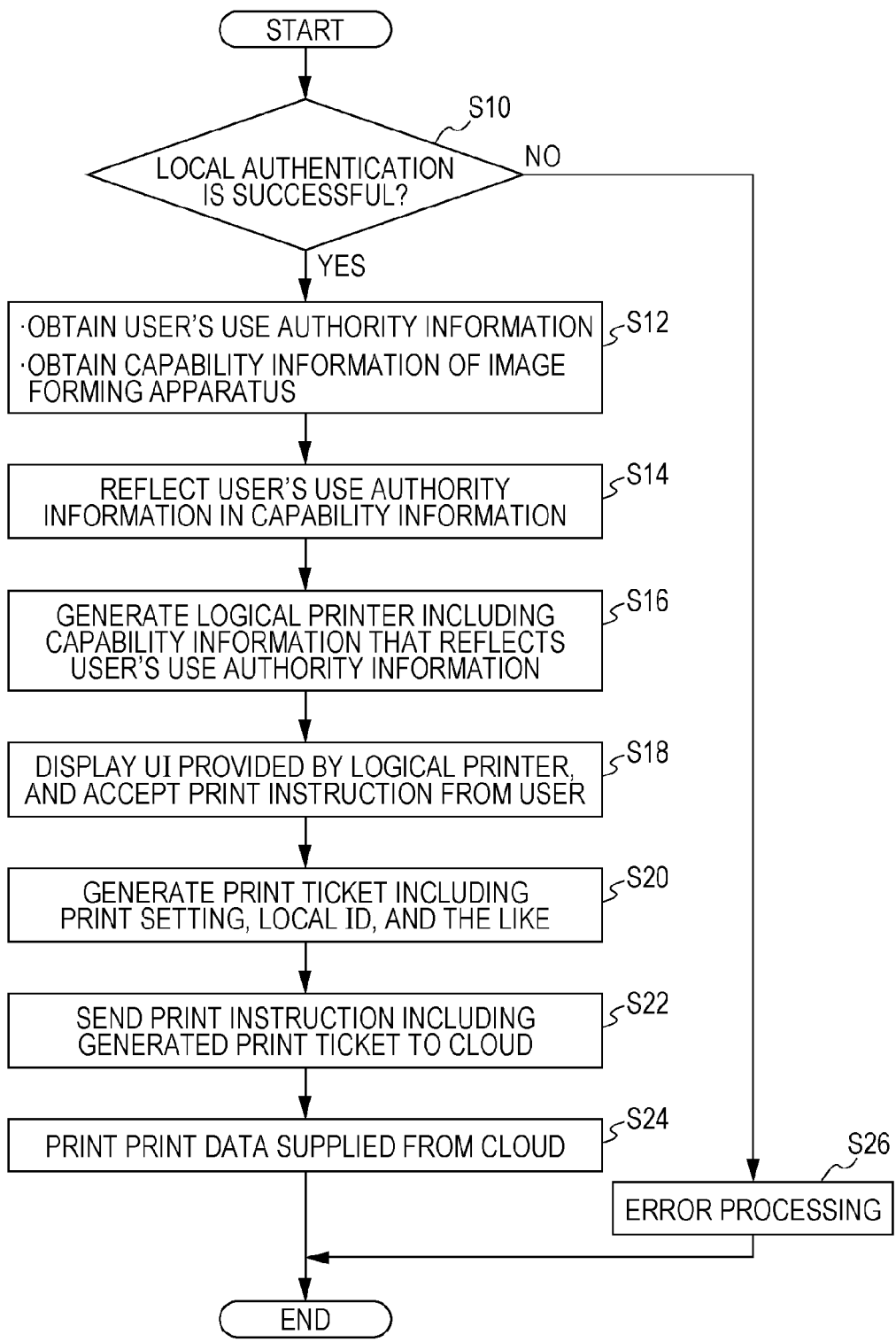
FIG. 19 is a diagram illustrating an example of the procedure of a process for realizing output restriction in accordance with the use authority of each user by using a cloud print service.

FIG. 19 illustrates an example of the procedure of a process performed by the image forming apparatus 110 in this example. In this procedure, the image forming apparatus 110 performs user authentication using an IC card or the like (S10), and, if the authentication is successful, the image forming apparatus 110 (particularly the logical printer setting unit 126) obtains the user's use authority information from the management DB 160, and obtains the capability information of the image forming apparatus 110 itself (S12). In the obtained capability information of the image forming apparatus 110, the current state of the image forming apparatus 110 (such as the type and number of sheets set in a sheet feeding unit) may be reflected.

By reflecting the user's use authority information in the capability information of the image forming apparatus 110 (that is, by more restricting the capability information in accordance with the use authority information), capability information specialized for the user is generated (S14). For example, in the case where the image forming apparatus 110 has both color printing and monochrome printing functions and the user only has authority to use monochrome printing, capability information specialized for the user is restricted to the monochrome printing function only. In another example, in the case where the image forming apparatus 110 has the facsimile sending function whereas the user has no authority to use facsimile sending, capability information specialized for the user has no facsimile sending function. In addition, the maximum number of output prints may be incorporated in the capability information specialized for the user. Information on the maximum number of output prints is used to determine, for example, the upper limit value of output prints specifiable by the user.

The image forming apparatus 110 sends the capability information specialized for the user, generated in step S14, to the cloud print service 200 in the form of, for example, setting information (such as PrintCapability) representing the capability of the image forming apparatus 110, and generates a new logical printer 210 that has the capability information specialized for the user as the setting information of the image forming apparatus 110 (S16). Alternatively, the image forming apparatus 110 sets the capability information specialized for the user as the setting information of the image forming apparatus 110 in an existing logical printer 210 (S16).

In response to specifying, by the user, in the logical printer 210 in which the capability information specialized for the user has been set, the image forming apparatus 110 as an output destination, a processing parameter setting UI in accordance with the capability setting information of the image forming apparatus 110 set in the logical printer 210 is provided from the logical printer 210 to the image forming apparatus 110 (S18). For example, in the case where the capability information specialized for the user indicates that both color printing and monochrome printing are possible, double-sided printing is impossible, and facsimile sending is possible, choices for selecting one of printing and facsimile sending are presented in the processing parameter setting UI, and, in the case where printing is selected, choices for selecting whether to perform color or monochrome printing are presented. In this case, even when the image forming apparatus 110 itself has the double-sided printing function, the choice of double-sided printing is not presented in the processing parameter setting UI. Alternatively, instead of the logical printer 210 generating a processing parameter setting UI, the logical printer 210 may transfer the setting information of the image forming apparatus 110 (the capability information specialized for the user) to the image forming apparatus 110, and the image forming apparatus 110 may generate a processing parameter setting UI from the setting information.

The user inputs setting items to the processing parameter setting UI (S18). That is, the user selects a desired choice(s) from among the choices presented by the processing parameter setting UI, and, if necessary, inputs the value of the number of output prints, for example (the number of output prints inputtable here may be restricted in accordance with the maximum number of output prints). In response to this, the image forming apparatus 110 generates a print ticket including the content of the processing parameter settings (such as the result of choice(s) selected by the user and an input made by the user) (S20), and sends a processing instruction including the print ticket to the logical printer 210 (S22).

The logical printer 210 converts document data to be processed, indicated by the processing instruction, into print data, and sends the print data along with the print ticket including the content of the processing parameter settings to the image forming apparatus 110. In accordance with the processing parameters indicated in the print ticket, the image forming apparatus 110 processes (such as prints) the print data (S24).

By including the user's local ID as a uniquely defined element in the print ticket generated in step S20, the user's local ID may be included in the print ticket sent along with the print data from the logical printer 210, as with the example described with reference to FIGS. 1 to 7. In addition, instead of including the user's local ID in the print ticket generated in step S20 and sending the print ticket to the logical printer 210, the local ID may be included as a uniquely defined element in the capability setting information of the image forming apparatus 110, sent to the cloud print service 200 in step S16. Also in this case, the print ticket sent along with the print data from the logical printer 210 includes the user's local ID.

If the user authentication is unsuccessful in step S10, the image forming apparatus 110 performs error processing such as displaying an error message (S26).

In the example illustrated in FIG. 19, if the user authentication is successful, the flow proceeds to step S12 onward. Alternatively, after the user authentication is successful, only when the user inputs an instruction to use the cloud print service 200, the process may proceed to step S12 onward. In the case where the user specifies processing that does not use the cloud print service 200 (such as local copying or facsimile sending), the specified processing is simply executed, as has been conventionally done.

In the above-described output restriction mechanism, for a user who has performed user authentication with a temporary ID, in one example, in generation of capability information (PrintCapability) specialized for the user in step S14, default use authority information for a temporary ID, illustrated in FIG. 18 by way of example, is used. In another example, a regular local ID corresponding to the temporary ID is specified, and use authority information corresponding to the regular local ID is used. Such a method is adoptable if it only takes a short period of time to specify a regular local ID corresponding to a temporary ID.

Notification Regarding Processing

Hereinafter, a service in which, in the case where the image forming apparatus 110 executes processing for which an instruction has been given by a user, notification regarding the processing is given to the user or other people concerned will be described.

Figure 20:
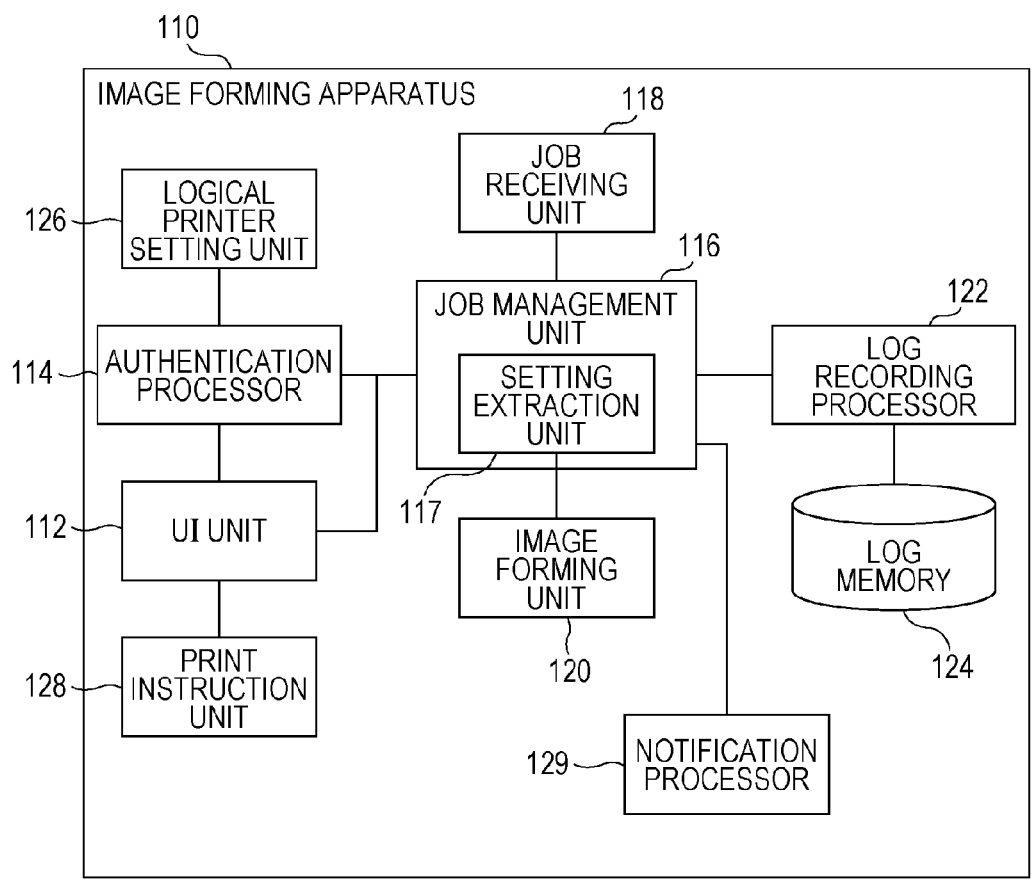
FIG. 20 is a diagram illustrating an example of the image forming apparatus including a notification processor.

In this example, as illustrated in FIG. 20, the image forming apparatus 110 includes a notification processor 129. The notification processor 129 executes notification processing described below by way of example. Note that elements other than the notification processor 129 of the image forming apparatus 110 illustrated in FIG. 20 are the same as or similar to elements with the same reference numerals illustrated in FIG. 2.

In one example, in the case where a user performs printing processing with the image forming apparatus 110 using the cloud print service 200, the image forming apparatus 110 notifies the user of the processing result via the cloud service using the user's cloud ID. Notification is simply given by using an email service or a message service (such as a short message service) provided by the cloud service. That is, in the case where the cloud service manages destination information corresponding to the cloud ID, the cloud services gives notification using the destination information.

For example, in the case where printing is performed using Google Cloud Print, the user is notified using Gmail (registered trademark), which is an email service, or Google Talk (registered trademark), where the same Google account is usable.

Since the cloud ID (cloud account) has already been input at the time the user has used the cloud print service 200, it is only necessary to specify the cloud ID as a destination and to request the cloud service to notify the user.

In another example, in the case where a user is authenticated by using his/her regular local ID and gives a processing instruction (in this case, the user is an employee), notification regarding the processing is sent to a contact destination (such as an email address, see FIG. 12) registered in the management DB 160 in association with the local ID.

Meanwhile, for processing for which a user has given instruction using an ID whose corresponding contact destination is not registered in the management DB 160, as in a guest ID or a temporary ID, the image forming apparatus 110 sends notification regarding the processing via the cloud service using the user's cloud ID. Such notification using a cloud ID is possible in the case where the user has input his/her cloud ID to the image forming apparatus 110 (input when, for example, printing using the cloud print service 200 has been performed).

The content of notification sent by the image forming apparatus 110 to a user who has given a processing instruction includes, for example, the actual result value of the processing (such as the number of output prints) and the user's upper limit value of the number of outputtable prints updated by reflecting the actual result value.

In addition, the image forming apparatus 110 may send notification regarding processing to those who are concerned, other than a user who has given an instruction to perform the processing. In one example, in the case where a user uses the image forming apparatus 110 using a temporary ID or a guest ID, a predetermined administrator who administers such local IDs and guest IDs is notified of the content of processing performed by the user. Address information (such as an email address) of the administrator at a notification destination is either set in the image forming apparatus 110 or is obtainable by the image forming apparatus 110 from a certain apparatus in the in-house network 100.

Notification sent by the image forming apparatus 110 to the administrator may include, for example, the processing time and date, identification information of the image forming apparatus 110 which has performed the processing, identification of the user who has given the processing instruction (obtainable information from among a temporary ID, guest ID, cloud ID, name, and the like), various types of information indicating the content of the processing (such as the processing type, processing parameters, number of output prints, and image data or an image serving as a processing target). Needless to say, the administrator may not necessarily be notified of all the pieces of information given above, and may be notified of information other than those pieces of information given above. The administrator refers to information included in the notification and checks the user's temporary use state of the image forming apparatus 110.

In addition, in the case where a destination to which the fee for processing executed by the image forming apparatus 110 is to be billed is changed to a person other than the user who has given an instruction to execute the processing, the image forming apparatus 110 may notify the new to-be-billed destination of information regarding the processing. In this case, the new to-be-billed destination after the change is determinable from, for example, a to-be-billed destination element (see FIG. 15) included in a print ticket that comes from the cloud print service 200 along with print data, and the contact destination address of the new to-be-billed destination is simply obtained from information on the contact destination included in management information (see FIGS. 12 to 14) of users (employees), divisions, and projects held by the management DB 160. The new to-be-billed destination is simply notified of the same or similar information as the above-described administrator. Reading the notification, a person in charge at the new to-be-billed destination is able to check whether abnormal processing such as mass printing has been performed.

Instead of notifying the administrator or the new to-be-billed destination of all processes serving as targets (such as all processes whose to-be-billed destinations have been changed), the administrator or the new to-be-billed destination may be notified of, among these processes serving as targets, processes that satisfy a predetermined notification condition. The notification condition is a condition for extracting a process that is highly likely to be abnormal, to which the administrator or the new to-be-billed destination should pay special attention. Specific examples of the notification condition include the fact that the number of prints that exceeds a predetermined threshold are printed at one time, the fact that the sum of output prints processed in response to a user instruction(s) given within a most recent period exceeds a predetermined threshold, and the fact that print data including a character string or an image (such as a secret mark) that is determined in advance to be monitored is output.

In one example, for each type (regular, temporary, or guest) of local ID used for authentication, whether to notify the user, whether to notify the administrator, and whether to notify the new to-be-billed destination are set in the image forming apparatus 110. This setting may be made not for each type of local ID, but for each local ID. In addition, for each type of notification destination (user, administrator, or new to-be-billed destination), items of notification information are set in the image forming apparatus 110. The notification processor 129 of the image forming apparatus 110 specifies a notification destination in accordance with the setting, obtains address information of the specified notification destination from the management DB 160 or the like, and sends notification including the set information items to each notification destination.

Alternatively, processing described as being executed by the aggregation apparatus 150 in the above-described examples may be executed by a built-in computer in the image forming apparatus 110.

The information processing function parts (parts that execute a function module group other than the image forming unit 120 in the example illustrated in FIG. 2) of the image forming apparatus 110, and the intermediary apparatus 600, which are described above by way of example, are realized by running, for example, on a general computer, a program that represents processing of the individual function modules of the image forming apparatus 110 and the intermediary apparatus 600. Here, the computer has a circuit configuration in which, as hardware, a microprocessor such as a central processor (CPU), memories (main storages) such as a random-access memory (RAM) and a read-only memory (ROM), a hard disk drive (HDD) controller that controls an HDD, various input/output (I/O) interfaces, a network interface that performs control for connection with a network such as a LAN, and the like are interconnected via, for example, bus. Further, for example, a disk drive for reading and/or writing data from/to portable disk recording media, such as a compact disc (CD) and a digital versatile disc (DVD), via an I/O interface, and a memory reader/writer for reading and/or writing data from/to portable non-volatile recording media in various standards, such as a flash memory, may be connected to the bus. A program in which the contents of the processing of the individual function modules described above by way of example are written is saved in a fixed storage such as an HDD via a recording medium such as a CD or a DVD or via a communication tool such as a network, and the program is installed in the computer. The program stored in the fixed storage is read to the RAM and executed by the microprocessor such as the CPU, thereby realizing the function module group described above by way of example.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus that performs printing processing using first identification information in a first system in a particular organization that performs first authentication, the first identification information being information that identifies a user in the first authentication, the apparatus comprising:
    an obtaining unit that obtains print data from a logical printer in a second system that is a cloud service system that performs second authentication, wherein setting information including the first identification information is set in the logical printer, and the image forming apparatus is set as an output destination in the logical printer; and
    a controller that controls printing processing of the print data obtained by the obtaining unit using the first identification information included in setting information set in the obtained print data,
    wherein identification information of the user, which is temporarily issued in the first system, is used as the first identification information.

2. The image forming apparatus according to claim 1, wherein, in the case where the first identification information included in the setting information set in the obtained print data is the user's temporarily issued identification information, a fee for the printing processing is recorded as a fee billed to a predetermined to-be-billed destination.

3. The image forming apparatus according to claim 1, further comprising:
    a use authority obtaining unit that obtains, from a predetermined use authority memory device in the first system, use authority information indicating whether a user who has been authenticated by the first authentication using the first identification information has authority to use the image forming apparatus;
    a generating unit that generates restricted capability information by more restricting information on capability of the image forming apparatus in accordance with the user's use authority information obtained by the use authority obtaining unit; and
    a setting unit that sets capability setting information including the restricted capability information in the logical printer in the second system by accessing the second system using second identification information, the second identification information being information that identifies the user in the second authentication.

4. The image forming apparatus according to claim 3, further comprising a log memory that records log information including the first identification information included in the setting information set in the obtained print data, the second identification information of the user corresponding to the first identification information, and log image data representing the obtained print data or a to-be-printed image generated from the obtained print data.

5. The image forming apparatus according to claim 3, further comprising a notification unit that notifies the user who has the second identification information of information regarding the printing processing of the obtained print data, via the second system using the second identification information.

6. An information processing system comprising:
    a first identification information obtaining unit that obtains first identification information input by a user for user authentication to an image forming apparatus connected to a first system that performs first authentication, the first identification information being identification information of the user in the first system;
    a second identification information obtaining unit that obtains second identification information that is identification information of the user in a second system that performs second authentication;
    a setting unit that sets setting information including the obtained first identification information in a logical printer in the second system by accessing the second system using the obtained second identification information, and, that sets, as identification information of a user of the logical printer, the obtained second identification information in the logical printer; and
    a printing processor that receives and performs printing processing of to-be-printed print data generated by the logical printer in the second system, and extracts and outputs the first identification information included in setting information set in the received print data, wherein identification information of the user, which is temporarily issued in the first system, is usable as the first identification information.

7. The information processing system according to claim 6, further comprising a billing memory that records, in the case where the first identification information included in the setting information set in the obtained print data is the user's temporarily issued identification information, a fee for the printing processing as a fee billed to a predetermined to-be-billed destination.

8. The information processing system according to claim 6, further comprising:
   a use authority obtaining unit that obtains, from a predetermined use authority memory device in the first system, use authority information indicating whether a user who has been authenticated by the first authentication using the first identification information has authority to use the image forming apparatus;
   a generating unit that generates restricted capability information by more restricting information on capability of the image forming apparatus in accordance with the user's use authority information obtained by the use authority obtaining unit; and
   a capability setting information setting unit that sets capability setting information including the restricted capability information in the logical printer in the second system by accessing the second system using the second identification information.

9. The information processing system according to claim 8, further comprising a log memory that records log information including the first identification information included in the setting information set in the obtained print data, the second identification information of the user corresponding to the first identification information, and log image data representing the obtained print data or a to-be-printed image generated from the obtained print data.

10. The information processing system according to claim 8, further comprising a notification unit that notifies the user who has the second identification information of information regarding the printing processing of the obtained print data, via the second system using the second identification information.

11. An image forming method comprising:
   obtaining print data including first identification information that is identification information of a user in a first system that performs first authentication, to which an image forming apparatus is connected, the print data being generated by a logical printer in a second system that performs second authentication, wherein setting information including the first identification information is included in the logical printer, and the image forming apparatus is set as an output destination in the logical printer;
   controlling printing processing using the first identification information included in setting information set in the obtained print data; and
   using identification information of the user, which is temporarily issued in the first system, as the first identification information.

12. A non-transitory computer readable medium storing a program causing a computer to execute a process, the process comprising:
   obtaining print data including first identification information that is identification information of a user in a first system that performs first authentication, to which an image forming apparatus is connected, the print data being generated by a logical printer in a second system that performs second authentication, wherein setting information including the first identification information is included in the logical printer, and the image forming apparatus is set as an output destination in the logical printer;
   controlling printing processing using the first identification information included in setting information set in the obtained print data; and
   using identification information of the user, which is temporarily issued in the first system, as the first identification information.

\* \* \* \* \*